US012699027B2

(12) United States Patent
Smith et al.

(10) Patent No.: US 12,699,027 B2
(45) Date of Patent: Aug. 4, 2026

(54) SYSTEMS AND METHODS FOR SECTION TRANSFER

(71) Applicant: Clarapath, Inc., Hawthorne, NY (US)

(72) Inventors: Weston Smith, South Orange, NJ (US);
Robert Shusko, Hawthorne, NY (US);
Partha P. Mitra, New York, NY (US);
Baris Yagci, Montclair, NJ (US)

(73) Assignee: Clarapath, Inc., Hawthorne, NY (US)

( * ) Notice: Subject to any disclaimer, the term of this patent is extended or adjusted under 35 U.S.C. 154(b) by 1085 days.

(21) Appl. No.: 17/744,318

(22) Filed: May 13, 2022

(65) Prior Publication Data

US 2022/0364960 A1 Nov. 17, 2022

Related U.S. Application Data

(60) Provisional application No. 63/188,003, filed on May 13, 2021.

(51) Int. Cl.
*G01N 1/06* (2006.01)
*G01N 1/14* (2006.01)
(Continued)

(52) U.S. Cl.
CPC .................. *G01N 1/06* (2013.01); *G01N 1/14* (2013.01); *G01N 1/18* (2013.01);
(Continued)

(58) Field of Classification Search
CPC ...... G01N 1/06; G01N 35/00009; G01N 1/14; G01N 1/18; G01N 35/00029;
(Continued)

(56) References Cited

U.S. PATENT DOCUMENTS 4,511,224 A 4/1985 Sitte et al.
5,746,855 A 5/1998 Bolles
(Continued)

FOREIGN PATENT DOCUMENTS

CN 110672607 A * 1/2020 .............. G01N 1/30
CN 212115045 U 12/2020
(Continued)

OTHER PUBLICATIONS

International Search Report in PCT International Application No. PCT/US2022/029266 mailed Oct. 5, 2022.
(Continued)

*Primary Examiner* — Ghassem Alie
(74) *Attorney, Agent, or Firm* — Greenberg Traurig, LLP; Roman Fayerberg; Richard Brooks

(57) ABSTRACT

Provided here are systems and methods for microtomy, including a microtome and a transfer tape system. The microtome can be used for sectioning a tissue section from a tissue block. The transfer tape system can include a transfer tape configured to adhere to a front face of the tissue block and collect one or more tissue sections sectioned by the microtome and to transfer the one or more tissue sections to one or more slides; and at least one tension device for controlling tension and an angle of the transfer tape relative the tissue block or the one or more slides. The at least one tension device can be configured to maintain the transfer tape at a predetermined tension or maintain the transfer tape at a predetermined angle relative to the tissue block or the one or more slides.

14 Claims, 14 Drawing Sheets

(51) Int. Cl.
    *G01N 1/18*            (2006.01)
    *G01N 35/10*        (2006.01)
(52) U.S. Cl.
    CPC . *G01N 2001/061* (2013.01); *G01N 2001/185*
              (2013.01); *G01N 35/1081* (2013.01)
(58) Field of Classification Search
    CPC ......... G01N 35/1081; G01N 2001/068; G01N
                 2001/2833; G01N 2001/185; G01N
                 2035/00138; G01N 2001/061
    USPC .......................... 83/13, 412, 522, 714, 915.5
    See application file for complete search history.

(56) References Cited

U.S. PATENT DOCUMENTS

| | | | |
|---|---|---|---|
| 6,387,653 B1 | 5/2002 | Voneiff et al. | |
| 6,568,307 B1 | 5/2003 | Gunther | |
| 6,720,191 B1 | 4/2004 | Goldstein et al. | |
| 7,374,907 B1 | 5/2008 | Voneiff et al. | |
| 7,503,245 B2 * | 3/2009 | Miyazawa | G01N 1/06 |
| | | | 83/13 |
| 8,074,547 B2 | 12/2011 | Ito et al. | |
| 8,087,334 B2 * | 1/2012 | Miyatani | G01N 1/06 |
| | | | 83/155.1 |
| 8,687,858 B2 | 4/2014 | Walter et al. | |
| 9,032,854 B2 | 5/2015 | Yang et al. | |
| 9,164,014 B2 | 10/2015 | Ito | |
| 9,279,749 B2 | 3/2016 | Donovan et al. | |
| 9,354,147 B2 | 5/2016 | Lefebvre | |
| 9,488,552 B2 | 11/2016 | Whited | |
| 9,933,339 B2 | 4/2018 | Briggman | |
| 10,228,311 B2 | 3/2019 | Stephens et al. | |
| 10,473,557 B2 | 11/2019 | Mitra et al. | |
| 10,571,368 B2 | 2/2020 | Zhang et al. | |
| 10,724,929 B2 | 7/2020 | Zhang et al. | |
| 11,169,056 B2 | 11/2021 | Mitra et al. | |
| 11,435,268 B2 | 9/2022 | Mitra et al. | |
| 11,467,071 B2 | 10/2022 | Mitra et al. | |
| 11,506,577 B2 | 11/2022 | Zhang et al. | |
| 11,609,162 B2 | 3/2023 | Mitra et al. | |
| 11,630,035 B2 | 4/2023 | Mitra et al. | |
| 11,821,826 B2 | 11/2023 | Mitra et al. | |
| 11,874,208 B2 | 1/2024 | Mitra et al. | |
| 11,898,948 B2 | 2/2024 | Mitra et al. | |
| 11,959,835 B2 | 4/2024 | Mitra et al. | |
| 12,158,404 B2 | 12/2024 | Mitra et al. | |
| 12,292,360 B2 | 5/2025 | Mitra et al. | |
| 12,392,687 B2 | 8/2025 | Zhang et al. | |
| 12,405,194 B2 | 9/2025 | Mitra et al. | |
| 2003/0022271 A1 | 1/2003 | Voneiff et al. | |
| 2003/0120633 A1 | 6/2003 | Torre-Bueno | |
| 2004/0011020 A1 | 1/2004 | Nomura | |
| 2005/0126311 A1 | 6/2005 | Miyazawa et al. | |
| 2005/0235542 A1 | 10/2005 | Metzner et al. | |
| 2006/0086221 A1 | 4/2006 | Kong | |
| 2007/0039435 A1 | 2/2007 | Kokubo | |
| 2007/0141711 A1 | 6/2007 | Stephens et al. | |
| 2007/0180965 A1 | 8/2007 | Ito et al. | |
| 2007/0199418 A1 | 8/2007 | Ito | |
| 2008/0286149 A1 | 11/2008 | Roe et al. | |
| 2009/0110253 A1 | 4/2009 | Torre-Bueno | |
| 2009/0214088 A1 | 8/2009 | Sorenson et al. | |
| 2010/0021037 A1 | 1/2010 | Zahniser et al. | |
| 2010/0093022 A1 * | 4/2010 | Hayworth | G01N 1/06 |
| | | | 83/72 |
| 2010/0118133 A1 | 5/2010 | Walter et al. | |
| 2010/0279342 A1 | 11/2010 | Kijima et al. | |
| 2011/0111435 A1 | 5/2011 | Dobson et al. | |
| 2011/0249109 A1 | 10/2011 | Fine | |
| 2011/0303352 A1 | 12/2011 | Nakajima et al. | |
| 2012/0149050 A1 | 6/2012 | Lapen et al. | |
| 2012/0208184 A1 | 8/2012 | Ragan | |
| 2013/0164781 A1 | 6/2013 | Lefebvre | |
| 2014/0026683 A1 | 1/2014 | Hayworth et al. | |

| | | |
|---|---|---|
| 2014/0041500 A1 | 2/2014 | Isagawa et al. |
| 2014/0051158 A1 | 2/2014 | Nakajima et al. |
| 2014/0098376 A1 | 4/2014 | Hashimshony |
| 2014/0137715 A1 | 5/2014 | Sneyders et al. |
| 2015/0013512 A1 | 1/2015 | Yang et al. |
| 2015/0017679 A1 | 1/2015 | Ito et al. |
| 2015/0268141 A1 | 9/2015 | Miyatani |
| 2015/0293026 A1 | 10/2015 | Shin et al. |
| 2015/0293133 A1 | 10/2015 | Shoffner et al. |
| 2016/0063724 A1 | 3/2016 | Tunstall et al. |
| 2016/0091400 A1 | 3/2016 | Whited et al. |
| 2016/0139004 A1 | 5/2016 | Witte |
| 2016/0245833 A1 | 8/2016 | Lefebvre |
| 2017/0003309 A1 | 1/2017 | Mitra et al. |
| 2017/0067800 A1 | 3/2017 | Briggman |
| 2017/0122844 A1 | 5/2017 | Chen |
| 2017/0161428 A1 | 6/2017 | Mitra |
| 2017/0205317 A1 | 7/2017 | Zhang et al. |
| 2017/0276574 A1 | 9/2017 | Webber et al. |
| 2017/0303832 A1 | 10/2017 | Yasui |
| 2017/0328818 A1 | 11/2017 | Zhang et al. |
| 2017/0372471 A1 | 12/2017 | Euren |
| 2018/0108163 A1 | 4/2018 | Remiszewski |
| 2018/0136089 A1 | 5/2018 | Bui et al. |
| 2018/0143214 A1 | 5/2018 | Bueren et al. |
| 2019/0176194 A1 | 6/2019 | Chen et al. |
| 2019/0250071 A1 | 8/2019 | Hayworth et al. |
| 2019/0301980 A1 | 10/2019 | Anderson et al. |
| 2019/0355135 A1 | 11/2019 | Rhodes |
| 2019/0368982 A1 | 12/2019 | Schleifer et al. |
| 2020/0041387 A1 | 2/2020 | Rhodes et al. |
| 2020/0064232 A1 | 2/2020 | Mitra et al. |
| 2020/0160522 A1 | 5/2020 | Merlo et al. |
| 2020/0166434 A1 | 5/2020 | Zhang et al. |
| 2020/0388032 A1 | 12/2020 | Chiang et al. |
| 2021/0149174 A1 | 5/2021 | Levenson |
| 2021/0262905 A1 | 8/2021 | Mitra et al. |
| 2021/0262907 A1 | 8/2021 | Mitra et al. |
| 2021/0263055 A1 | 8/2021 | Mitra et al. |
| 2021/0323150 A1 | 10/2021 | Cho |
| 2022/0034768 A1 | 2/2022 | Mitra et al. |
| 2022/0034769 A1 | 2/2022 | Mitra et al. |
| 2022/0042887 A1 | 2/2022 | Mitra et al. |
| 2022/0113228 A1 | 4/2022 | Mitra et al. |
| 2022/0120641 A1 | 4/2022 | Chen et al. |
| 2022/0128810 A1 | 4/2022 | Mitra et al. |
| 2022/0349788 A1 | 11/2022 | Mitra et al. |
| 2022/0404241 A1 | 12/2022 | Yagci et al. |
| 2023/0057075 A1 | 2/2023 | Zhang et al. |
| 2023/0126618 A1 | 4/2023 | Mitra et al. |
| 2023/0221222 A1 | 7/2023 | Mitra et al. |
| 2023/0228651 A1 | 7/2023 | Yagci et al. |
| 2023/0359010 A1 | 11/2023 | Chen et al. |
| 2024/0167917 A1 | 5/2024 | Mitra et al. |
| 2024/0288342 A1 | 8/2024 | Mitra et al. |
| 2025/0146914 A1 | 5/2025 | Mitra et al. |

FOREIGN PATENT DOCUMENTS

| | | |
|---|---|---|
| DE | 102011116555 A1 | 4/2013 |
| DE | 10207118304 A1 | 2/2018 |
| EP | 0111290 A2 | 6/1984 |
| JP | S6385426 A | 4/1988 |
| JP | 2000190291 A | 7/2000 |
| JP | 2001324423 A | 11/2001 |
| JP | 2004013435 A | 1/2004 |
| JP | 2008020293 A | 1/2008 |
| JP | 2008134127 A | 6/2008 |
| JP | 2012229993 A | 11/2012 |
| JP | 2012229995 A | 11/2012 |
| JP | 2013535014 A | 9/2013 |
| JP | 2007218616 A | 1/2015 |
| WO | 1997003827 A1 | 2/1997 |
| WO | WO 2010151761 A2 | 12/2010 |
| WO | WO 2012147730 A1 | 11/2012 |
| WO | WO 2015046518 A1 | 4/2015 |
| WO | WO 2015175525 A1 | 11/2015 |
| WO | 2016016795 A1 | 2/2016 |
| WO | 2019209743 A1 | 10/2019 |

(56)    References Cited

FOREIGN PATENT DOCUMENTS

| WO | 2021053035 | A3 | 3/2021 |
|----|------------|----|--------|
| WO | 2021096950 | A1 | 5/2021 |
| WO | WO 2021168457 | A1 | 8/2021 |
| WO | WO 2022087443 | A1 | 4/2022 |
| WO | 2022241261 | A1 | 11/2022 |
| WO | 2022271732 | A1 | 12/2022 |
| WO | 2023092156 | A1 | 5/2023 |
| WO | 2023122620 | A2 | 6/2023 |

OTHER PUBLICATIONS

Willis et al., "Monitoring Cutting Forces with an Instrumented Histological Microtome", Journal of Microscopy, vol. 178, No. 1, pp. 56-65, Apr. 1, 1995.

\* cited by examiner

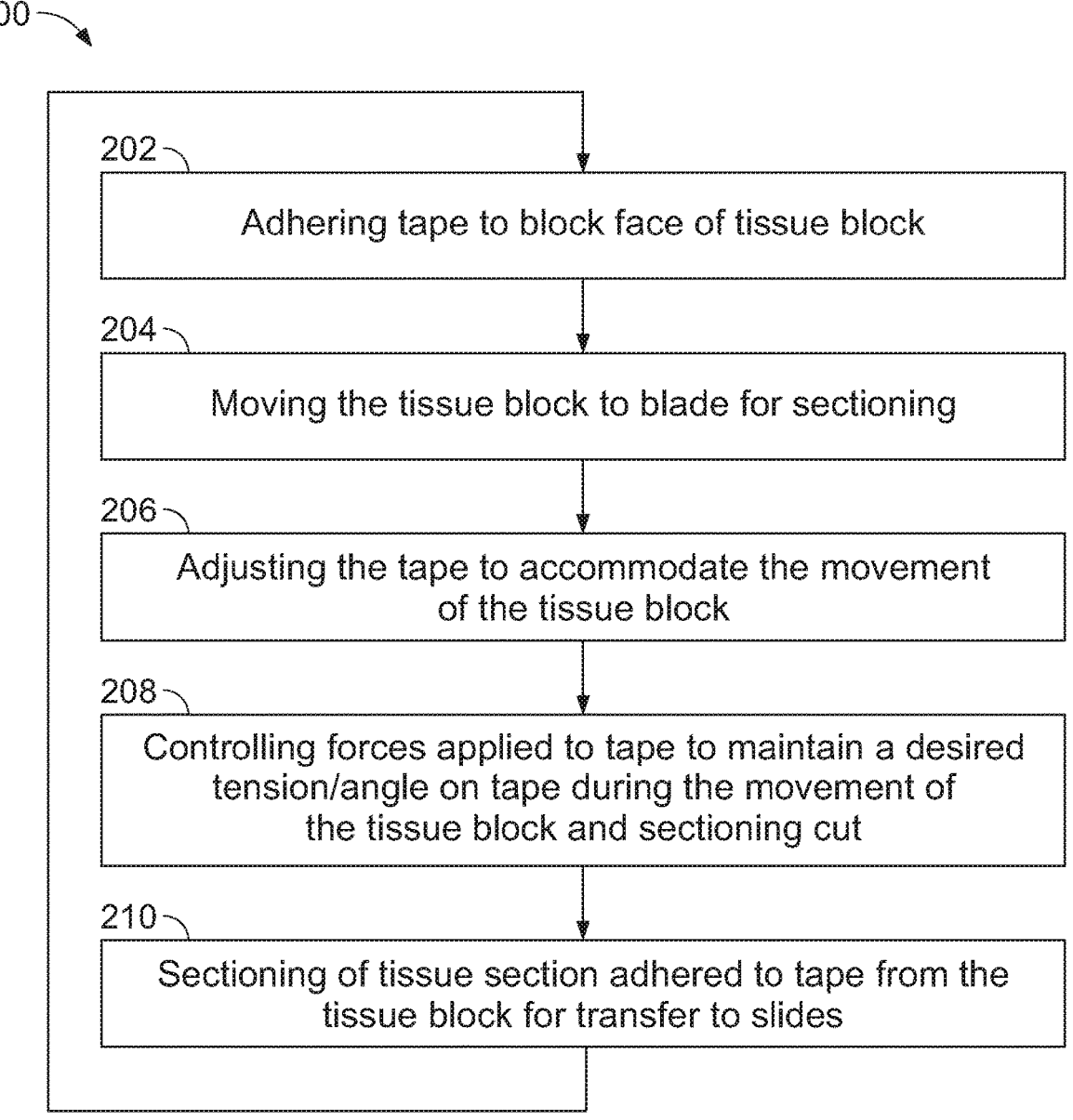

200

202
Adhering tape to block face of tissue block

204
Moving the tissue block to blade for sectioning

206
Adjusting the tape to accommodate the movement
of the tissue block

208
Controlling forces applied to tape to maintain a desired
tension/angle on tape during the movement of
the tissue block and sectioning cut 210
Sectioning of tissue section adhered to tape from the
tissue block for transfer to slides

502
Illuminating tissue block

504
Rapidly moving tissue block toward the blade

506
Detecting light returned from the tissue block to
determine intensity of returned light indicative
of position of tissue block 508
Stopping the movement of the tissue block when
a pre-determined intensity is sensed 510
Adjusting position of the tissue block relative
to microtome

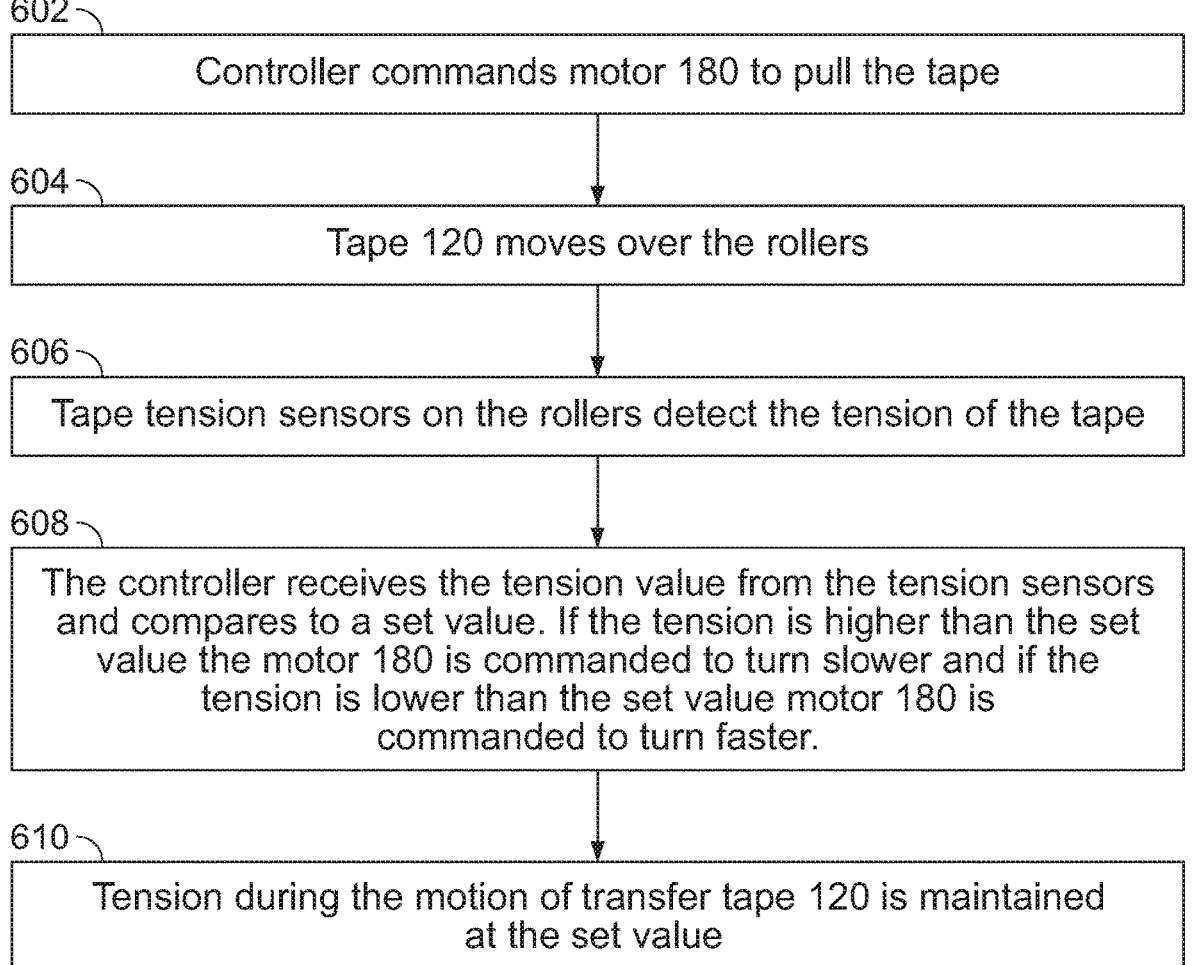

602 ⌐
Controller commands motor 180 to pull the tape

604 ⌐
Tape 120 moves over the rollers

606 ⌐
Tape tension sensors on the rollers detect the tension of the tape

608 ⌐
The controller receives the tension value from the tension sensors and compares to a set value. If the tension is higher than the set value the motor 180 is commanded to turn slower and if the tension is lower than the set value motor 180 is commanded to turn faster.

610 ⌐
Tension during the motion of transfer tape 120 is maintained at the set value

FIG. 6

702 — Controller commands motor 180 to pull the tape

704 — Tape 120 moves over the rollers and dancers

706 — Dancers react to tension on the tape

708 — If the tension is higher than a set value the dancer would go lower to decrease the tension and if the tension is lower than dancer would go up.

710 — Tension during the motion of transfer tape 120 is maintained at the set value

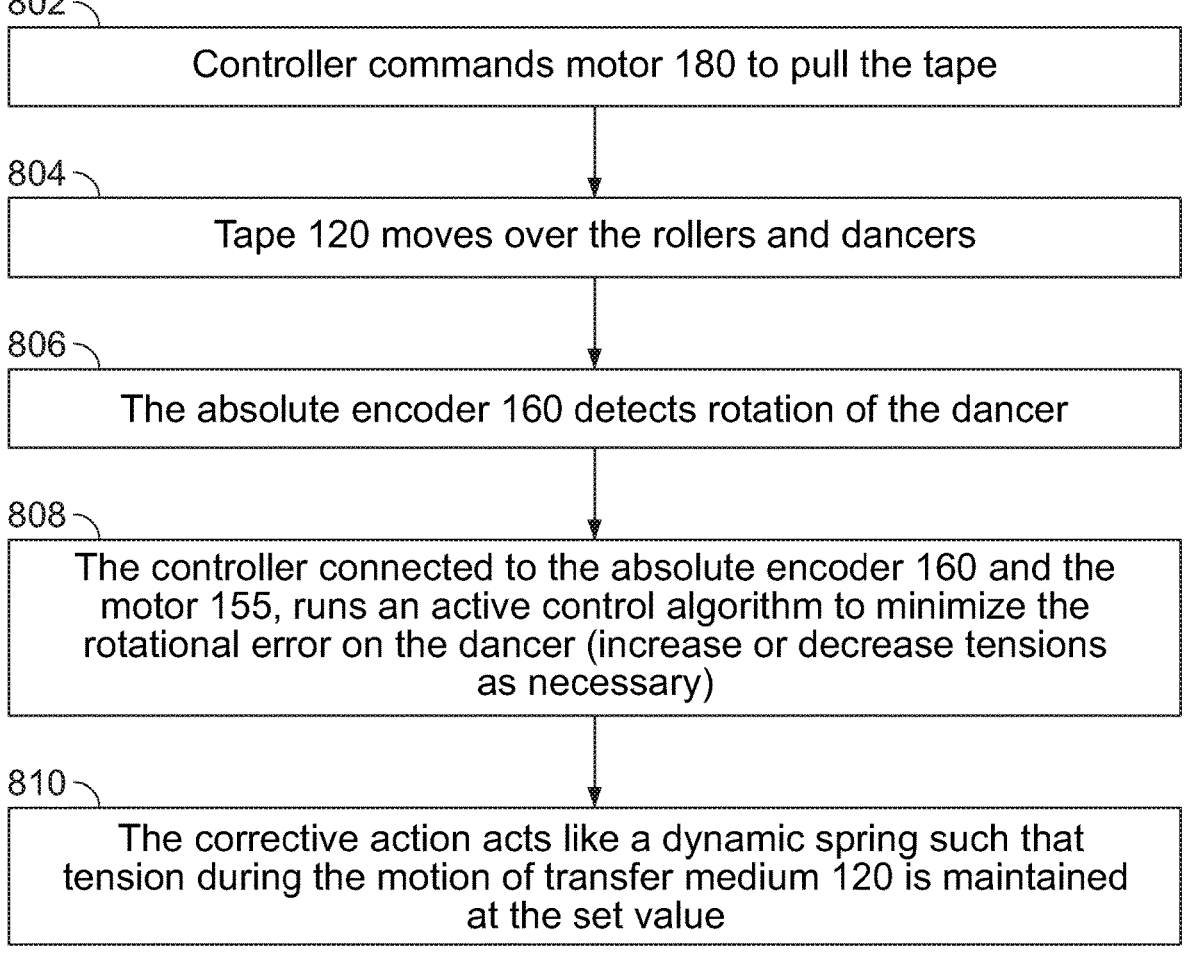

802
Controller commands motor 180 to pull the tape

804
Tape 120 moves over the rollers and dancers

806
The absolute encoder 160 detects rotation of the dancer

808
The controller connected to the absolute encoder 160 and the
motor 155, runs an active control algorithm to minimize the
rotational error on the dancer (increase or decrease tensions
as necessary)

810
The corrective action acts like a dynamic spring such that
tension during the motion of transfer medium 120 is maintained
at the set value

FIG. 8

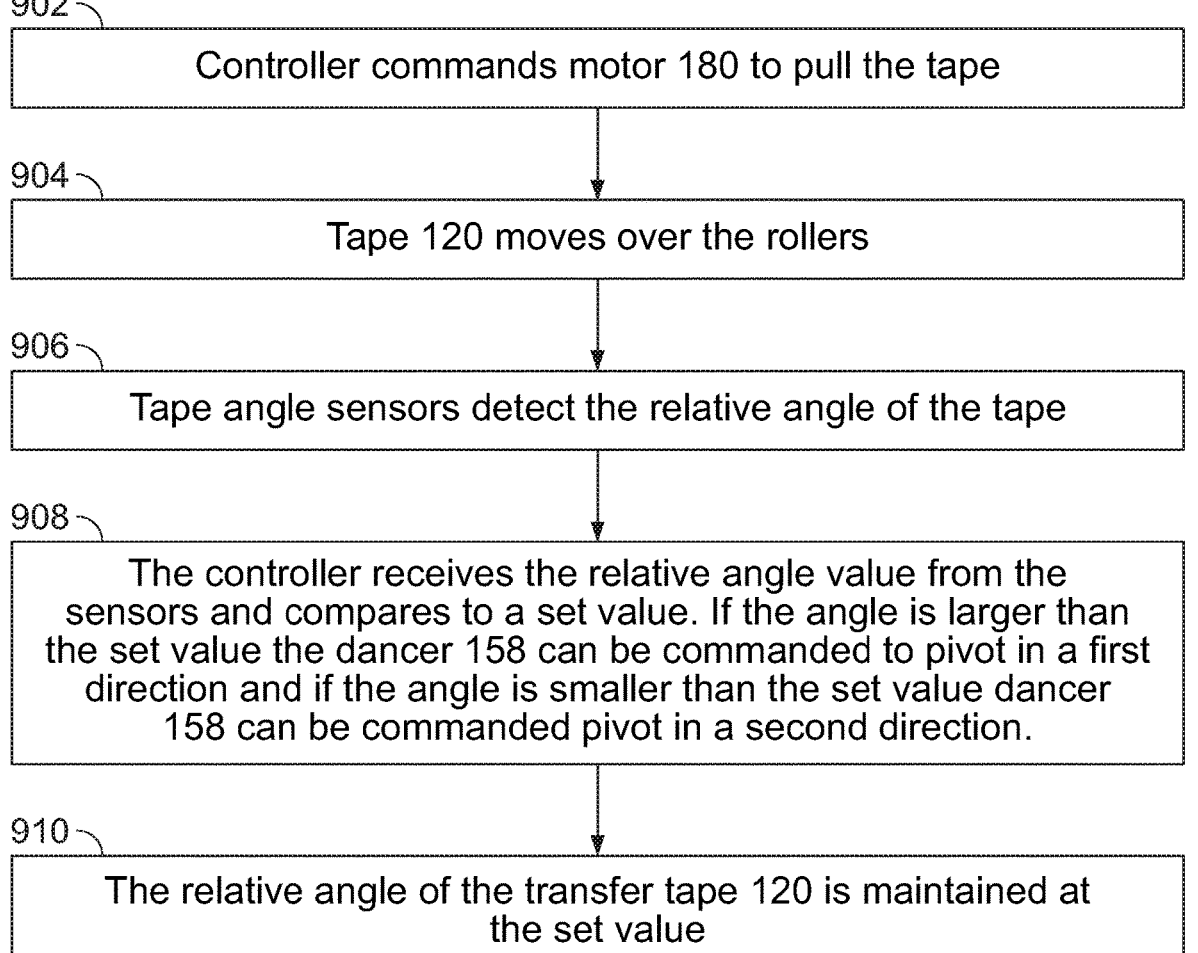

902
Controller commands motor 180 to pull the tape

904
Tape 120 moves over the rollers

906
Tape angle sensors detect the relative angle of the tape

908
The controller receives the relative angle value from the sensors and compares to a set value. If the angle is larger than the set value the dancer 158 can be commanded to pivot in a first direction and if the angle is smaller than the set value dancer 158 can be commanded pivot in a second direction.

910
The relative angle of the transfer tape 120 is maintained at the set value

FIG. 9

SYSTEMS AND METHODS FOR SECTION TRANSFER

CROSS-REFERENCE TO RELATED APPLICATION

This application claims priority to, and the benefit of, U.S. Provisional Application No. 63/188,003, filed May 13, 2021, which is hereby incorporated by reference in its entirety.

FIELD

The present disclosure relates to systems and methods for transferring samples over a transfer tape in a microtomy system. In particular, the present disclosure relates to a transfer tape system for managing a tension level and angle of the transfer tape.

BACKGROUND

Generally, a tape can be used for transporting materials from one point in a device to another point in the device. For example, a tape can be used for transferring sectioned samples in a microtomy system. Excessive tension or not enough tension (or slack) during sectioning onto the tape, during automated adhesive tape-transferred microtomy, can lead to poor sections or tape being cut. For example, if there is too much tension on the tape upon application of the tape to the block face of the sample block, there is a risk of the tape disengaging from the block face of the sample block. On the other hand, not enough tension (slack in the system) may be detrimental to the control and repeatability of the tape transfer process and may result in cutting of the tape. There is thus a need for improvements for managing a tension level for a tape for transferring a sample.

SUMMARY

The present disclosure provides methods and systems that address the need for improvements for managing a tension level, and relative angle, for a transfer tape system for transferring a sample. The present disclosure is directed toward various solutions to address this need, in addition to having other desirable characteristics.

In one embodiment a microtomy system is provided. The microtomy system including: a microtome for sectioning a tissue section from a tissue block; and a transfer tape system including: a transfer tape configured to adhere to a front face of the tissue block and collect one or more tissue sections sectioned by the microtome and to transfer the one or more tissue sections to one or more slides; and at least one tension device for controlling tension and an angle of the transfer tape relative the tissue block or the one or more slides; wherein the at least one tension device being configured to maintain the transfer tape at a predetermined tension or maintain the transfer tape at a predetermined angle relative to the tissue block or the one or more slides.

In some embodiments, the predetermined tension can be a desired tension range or a zero tension value. The at least one tension device can include at least one actuator and at least one sensor. The at least one sensor can be configured to determine the tension of the transfer tape. The at least one actuator can be configured to actively control the tension of the transfer tape. The at least one actuator can be one of a series elastic actuator and an active dancer to control tension of the transfer tape. The microtomy system can be configured to determine the tension of the transfer tape at a plurality of locations. The plurality of locations can include at least two of a location upstream of the microtome, at the microtome, and downstream of the microtome.

In some embodiments, the at least one tension device can be a swing arm to maintain the transfer tape at an angle relative to the tissue block. The microtomy system can further include a block holder configured to hold and retain tissue block, wherein the block holder can be movable relative to the microtome. The tension of the transfer tape can be maintained at locations upstream and downstream of the block holder. The at least one tension device can include an active drive mechanism upstream of the block holder and a passive tension device downstream of the block holder. Different amount tensions can be maintained at locations upstream and downstream of the block holder.

In some embodiments, the at least one tension device can be a passive tension device. The tension can be controlled by controlling a speed of the at least one tension device. The microtomy system can further include a slide station configured to receive the tissue section onto the one or more slides. The tension of the transfer tape can be maintained at different tensions at locations upstream and downstream of the slide station. An angle of the transfer tape relative to the slide station can be maintained at locations upstream and downstream of the slide station. A controller can be configured to receive one of tension data or a relative angle of the transfer tape from a sensor; determine whether the received data is within a predefined range; and cause at least one of the at least one tension device to adjust one of the angle or the tension of the transfer tape.

In one embodiment, a method for maintaining a predetermined tension along a transfer tape is provided. The method includes adhering a transfer tape to a front face of a tissue block; sectioning a sample from the front face of the tissue block with a microtome; receiving the sample on the transfer tape; transferring the sample to one or more slides; and adjusting one or more tension devices to maintain the transfer tape at a predetermined tension or maintain the transfer tape at a predetermined angle relative to the tissue block or the one or more slides.

In some embodiments, the predetermined tension can be a desired tension range or a zero tension value. The one or more tension devices can include at least one actuator and at least one sensor. The method can further include determining the tension of the transfer tape with the at least one sensor. The adjusting step can be performed by the at least one actuator to actively control the tension of the transfer tape, and wherein the at least one actuator can be one of a series elastic actuator and an active dancer to control tension of the transfer tape. The determining step can include determining the tension of the transfer tape at a plurality of locations. The plurality of locations can include at least two of a location upstream of the tissue block, at the tissue block, and downstream of the tissue block.

In some embodiments, the at least one actuator can be a swing arm, and wherein the adjusting step can include control of the angle of the transfer tape relative to the tissue block. The one or more tension devices can be a passive drive mechanism. The method can further include holding and retaining the tissue block with a block holder, wherein the block holder can be movable relative to the microtome. The tension of the transfer tape can be maintained at locations upstream and downstream of the block holder. The at least one tension device can include an active drive mechanism upstream of the block holder and a passive tension device downstream of the block holder. Different amount tensions can be maintained at locations upstream and downstream of the block holder.

In some embodiments, the tension device can be a passive tension device. The adjusting step can be accomplished by controlling a speed of the one or more tension devices. The method can further include transporting tissue sections cut from the tissue block, by the transfer tape, to a slide station for transferring the sample to one more slides. The method can include maintaining the tension of the transfer tape at different tensions at locations upstream and downstream of the slide station. The method can include maintaining an angle of the transfer tape relative to the slide station at locations upstream and downstream of the slide station. The method can further include receiving one of tension data or a relative angle of the transfer tape from a sensor; determining whether the received data is within a predefined range; and causing at least one of the at least one tension device to adjust one of the angle or the tension of the transfer tape.

In one embodiment, a microtomy system is provided. The microtomy system includes a microtome for sectioning a tissue section from a tissue block; a block holder configured to receive the tissue block and move the tissue block to the microtome for sectioning; and a positional sensor configured to determine a position of the block holder relative to the microtome, the positional sensor including: an illumination source; a light receiver, wherein the illumination source and the light receiver are positioned on opposite sides of the block holder, such that the light receiver is configured to sense intensity of light from the illumination source; a controller in communication with the positional sensor and configured to determine the position of the block holder relative to the microtome based on the intensity of light sensed by the light receiver.

In some embodiments, the microtomy system, can further include a transfer tape system including: a transfer tape configured to adhere to a front face of the tissue block and collect one or more tissue sections sectioned by the microtome and to transfer the one or more tissue sections to one or more slides; and at least one tension device for controlling tension and an angle of the transfer tape relative the tissue block or the one or more slides; wherein the at least one tension device being configured to maintain the transfer tape at a predetermined tension or maintain the transfer tape at a predetermined angle relative to the tissue block or the one or more slides.

BRIEF DESCRIPTION OF THE FIGURES

The present disclosure is further described in the detailed description which follows, in reference to the noted plurality of drawings by way of non-limiting examples of exemplary embodiments, in which like reference numerals represent similar parts throughout the several views of the drawings, and wherein:

FIGS. 2A and 2B is an example flow chart for operation of the transfer tape system in accordance with the present disclosure;

FIGS. 6-9 provide exemplary flow charts for regulating the tension of the transfer tape system.

Figure 1:
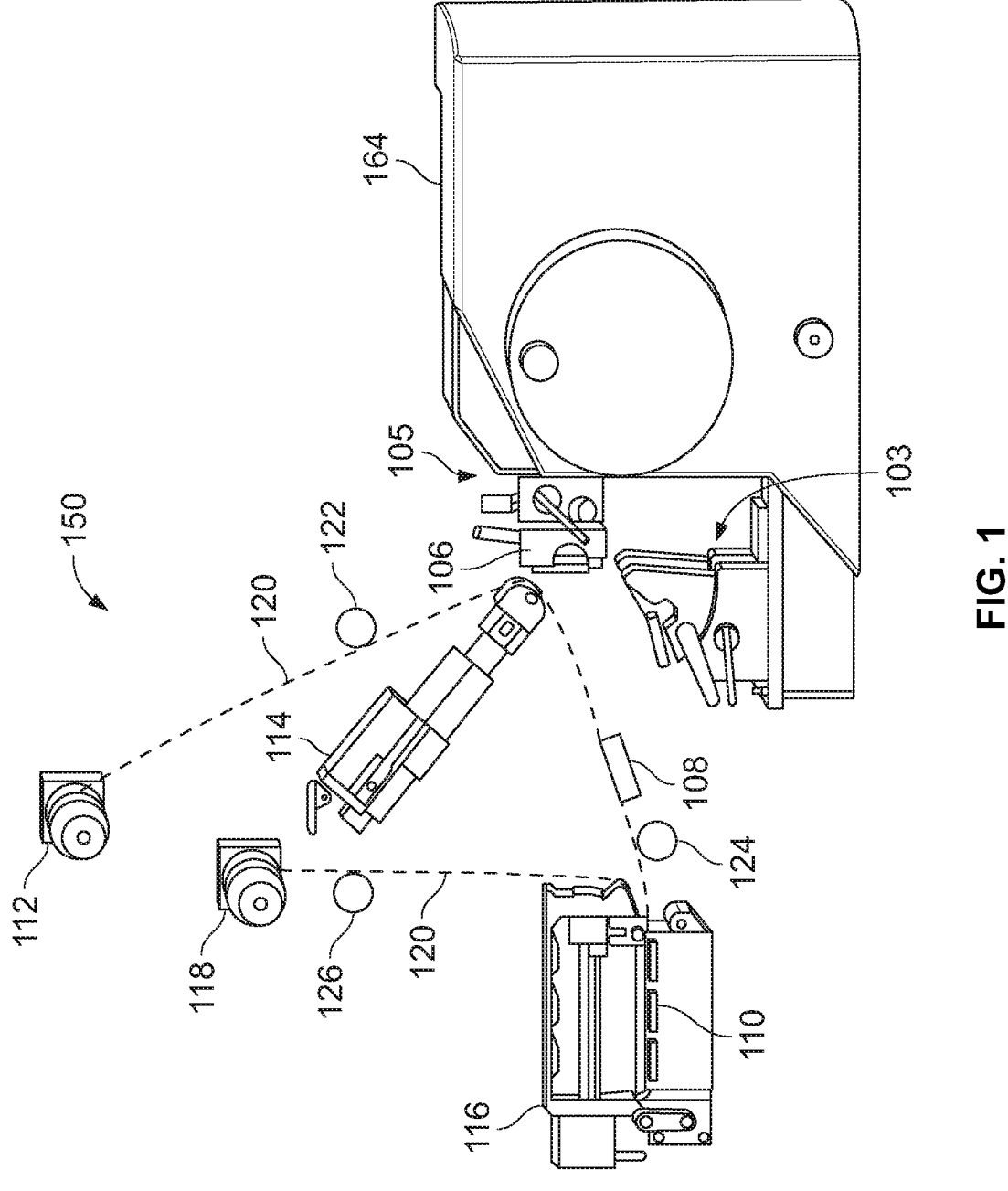
FIG. 1 is an illustrative view of a microtomy system in accordance with the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to an automated transfer tape system for transporting tissue sections cut from a tissue block by a microtome to slides. The system is configured to monitor and manage the tension or the angel of the transfer tape system during the transfer process. For example, the system can monitor and manage the tension or angle of the transfer tape system during the sample section by the microtome. In some embodiments, the tension of the transfer tape system can be held at a predetermined tension range, while in other embodiments, one or more sections of the transfer tape system may be maintained at no tension. Further, the tension may be set to different tensions at different locations of the transfer tape system (e.g., upstream, or downstream of the microtome). Additionally, or alternatively, the tension and angle of the transfer tape system may also be controlled and adjusted during the transfer of the tissue sections from the transfer tape system to the slides.

In some embodiments, the feed of the transfer tape system is controlled by motors each end of the tape path. The speed of feed reel and the take up reel can be selectively adjusted to achieve a desired tension or no tension in the transfer tape system. If the transfer tape system is pulled by the motors, the tension would increase. On the other hand, the take up motor can be slowed down to release the tension in the transfer tape system. In some embodiments, one or more tension control devices are provided along the tape path to regulate the tension on the transfer tape system. The tension control devices can apply tension on the transfer tape system when there is slack, or a lower tension, in the system and can release tension when the tension on the transfer tape system is high or the transfer tape system needs to have a lower, or no, tension. In some embodiments, the tension of the transfer tape system can be controlled using a combination of the feed reel, take up reel, and one or more tension control devices. In some embodiments, the tension may be adjusted and maintained at a predetermined range. In some embodiments, the system may be configured to ensure that the tape is not under tension at one or more preselected points. One of these points could be at the microtome interface where the tissue is picked up from the block face.

In some embodiments, a plurality of tension devices or mechanisms may be used at preselected points along the tape path to independently adjust the tension on the transfer tape system when the tape moves to keep the tape at a predetermined tension during various operations. For example, the tape can move, bow, have slack, or tension, during the sectioning process or the slide transfer process, but remains at a desired tension at the microtome or when the tissue sections are transferred to the slides, without too much tension and without any loss of tension, i.e., without any slack tending to introduce tape bending or other undulating motions. In some embodiments, the angle of the tape, relative to one or both of the microtome or slide transfer apparatus, can move during the sectioning process or the slide transfer process, which can compromise the efficacy of the microtome or slide transfer apparatus. In some embodiments, the present disclosure provides a plurality of force-mediated tension devices to keep the tape under a predetermined range of tension during the sectioning process. Such predetermined range of tension can allow for the necessary compliance, necessitated by the cutting or sectioning process, while also providing for the adherence of the cut tissue section to the transfer tape system. In some embodiments, additionally or alternatively, one or more tension devices are employed to keep the tape under a predetermined range of tension during the transfer of the tissue sections from the tape to the slides. In some embodiments, the microtomy system can fully control the motion of the tape during sectioning or tissue section transfer from tape to slides, whereas the tensioning elements can control the tension of the tape.

FIGS. 1 through 10, wherein like parts are designated by like reference numerals throughout, illustrate an example embodiment or embodiments of improved operation for managing a level of tension along a transfer tape system, according to the present disclosure. Although the present disclosure will be described with reference to the example embodiment or embodiments illustrated in the figures, it should be understood that many alternative forms can embody the present disclosure. One of skill in the art will additionally appreciate different ways to alter the parameters of the embodiment(s) disclosed, such as the size, shape, or type of elements or materials, in a manner still in keeping with the spirit and scope of the present disclosure.

FIG. 1 illustrates an exemplary embodiment of a microtomy system 150. The exemplars microtomy system can provide a path of a transfer tape 120 (for example, a transfer medium, or transfer tape) through the microtomy system 150. The transfer tape 120 can be used to transfer a tissue section 108 from a tissue block 106 through the microtomy system 150. The terms transfer tape 120, adhesive tape, transfer tape, and tape may be used interchangeable throughout the disclosure in reference to the same object. FIG. 1 shows a microtome module 164 that can include a tissue block holder 105, or chuck, and a microtome (blade) 103. The tissue block holder 105 can be designed to hold a tissue block 106 having a tissue sample that is enclosed in a supporting block of embedding material such as paraffin wax. A microtome blade 103 can be used for tissue sections 108, or a slice, from a face of the tissue block 106. In operation, in some embodiments, the tissue block holder 105 can move relative to a stationary microtome blade 103, up and down, to cut a tissue section 108 from a face of the tissue block 106. In addition to the transfer tapes 120 and the microtome 164, the microtomy system 150 of FIG. 1 can also include a tape feed mechanism 112, a tape applicator 114, a slide station 116, and a take-up reel 118. In operation, the tape feed mechanism 112 and the take-up reel 118 move the tape from the microtome module 164, where the transfer tape is adhered to the tissue block with the aid of the tape applicator 114 to pick up a tissue sec ion 108 sectioned from the tissue block 106, to the slide station 116, where the tissue section 108 is transferred from the transfer tape to a slide. As the tissue section 108 is applied to the transfer tape 120, the tissue block holder can move forwards and backwards, perpendicular to the up and down motion, to press against the transfer tape 120 to affect the tension in the transfer tape 120.

The microtomy system 150 can be designed to provide ideal parameters, e.g., tension or angle of approach, of the transfer tape 120 (e.g., adhesive tape) while samples are cut from a tissue block 106 at a microtome module 164, during adherence of the tissue section 108 onto the transfer tape 120, and during transfer of the tissue section 108 from the transfer tape 120 to slides 110. To carry out these processes in an improved manner, the microtomy system 150 can be designed to maintain a level of tension of the transfer tape 120 within an optimal tension threshold, or at no tension. In some embodiments, to carry out these processes in an improved manner, the microtomy system 150 can be designed to maintain the transfer tape at a desired angle relative to one, or both, of the microtome module 164 and transfer of the tissue section 108 to a slide 110. In a system 150, in some embodiments, the transfer tape 120 can be maintained under the same level of tension throughout the process. In some embodiments, the tension may be increased, decreased, or completely removed as necessary. In a system where a level of tension may vary along the transfer tape 120, for example, due to friction, mis-alignments, and processes being performed, the system 150 can be designed to control a level of tension level at different locations (e.g., of cutting, sample transfer, slide transfer, etc.). In some embodiments, tension can be controlled to maintain a level of tension ranging between 0.6N and 2N. As noted above, the transfer tape can also be maintained at no tension at one or more locations along the transfer tape, e.g., downstream of the tissue block 106. In some embodiments, the transfer tape can have one tension upstream of the tissue block 106 and another tension downstream of the tissue block 106. In other embodiments, the tension can vary when the slide 110 where the transfer tape 120 will adhere to the slide 110, creating upstream and downstream segments which will in general have different tensions, controlled (generally) in different ranges. The points where it may be desirable to control the level of tension can include the tissue section 108 transfer from the tissue block 106 to the transfer tape 120 and the transfer of the tissue section 108 from the transfer tape 120 to the glass slide 110.

In some embodiments, the tension in the transfer tape system can be regulated by regulating the speed of one or both of the tape feed mechanism 112 and the take-up mechanism 118. In some embodiments, the system 150 can include one or more tension control devices 122, 124, 126 to manage a tension level of the transfer tape 120. In some embodiments, the transfer tape can remain under a range of acceptable tensions during the sectioning or slide transfer processes. In some embodiment, the transfer tape can be maintained at no tension or minimal tension, at various location, e.g., downstream of the block, in the microtome.

In some embodiments, the optimal level of tension can be maintained using coordinated tension control devices 122, 124 located at various positions, e.g., both upstream and downstream of the microtome 164 for use during sectioning and during transfer of a sectioned sample to a slide 110. In some embodiments, an additional tension control device 126 can be disposed downstream of the slide table 168. There can be any number of points for tension modification/control in before, after, or between these locations without departing from the scope of the present disclosure. In some embodiments, a motor controller can command the motors for the tape feed mechanism 112 and the take-up mechanism 118 throughout the system 150 to adjust various elements to modify a level of tension at a given point(s). For example, tension can be measured with one or more tension sensors and the tension level can be provided to the motor controller so that the motor controller can adjust motor speeds for the tape feed mechanism 112 and the lake-up mechanism 118 to keep the tension within a given range or a predetermined level of tension or no tension. In another example, the motion of the transfer tape 120 can be read by one of the encoders (i.e., encoders 156, 160, 176, 178) directly engaged on the transfer tape 120. In some embodiments, the output from the encoders can be compared to motor commands to detect any slippage, and once the traction of the transfer tape 120 is established, tension of the transfer tape 120 can be calculated by using the transfer tape 120 elasticity and upstream/downstream motor commanded positions. These tension control devices 122, 124 may be passive mechanical elements, or active with sensor-feedback, or a combination.

In some embodiments, the tension control devices 122, 124 can be used to adjust the angle of incoming, or departing, transfer tape 120. For example, the incoming transfer tape approaching the tissue block 106, at the top, can be maintained nominally vertical because the transfer tape 120 can be attached to the face of the tissue block 106 before sectioning, as a geometrical necessity. In some embodiments, the departing transfer tape 120 can be maintained parallel to the blade clamp plate. When the section is being cut and right after the cut, the transfer tape 120 may need to move away from the tissue block. In such a case, the departure angle is ideally parallel to the blade clamp surface. In other cases, the transfer tape 120 can be maintained substantially parallel to the slide 110, upon which the sample is placed.

In between the application of the transfer tape 120 to the block face of the tissue block 106 and the completion of the sectioning cut of the block face, the microtomy process may involve risks from both excessive tension and insufficient tension (e.g., slack). Risks of excessive tension may include the transfer tape 120 losing contact with the block face before the cut is complete, such that the tissue section 108 may not be properly supported by the transfer tape 120 after sectioning, or the tissue block 106 fracturing, thus impacting subsequent sections, insofar as the block face is no longer planar. On the other hand, the risk of insufficient tension may result in lateral or sideways drifting of the transfer tape 120 across the mechanical guiding elements (such as idler rollers 162), flapping or bunching of the transfer tape 120, and/or the transfer tape 120 may be cut or otherwise damaged by the microtomy blade during sectioning. The one or more tension devices 122, 124 can work in combination, but independently of one another, to maintain a desired level or range of tension on the transfer tape during sectioning.

Figure 2B:
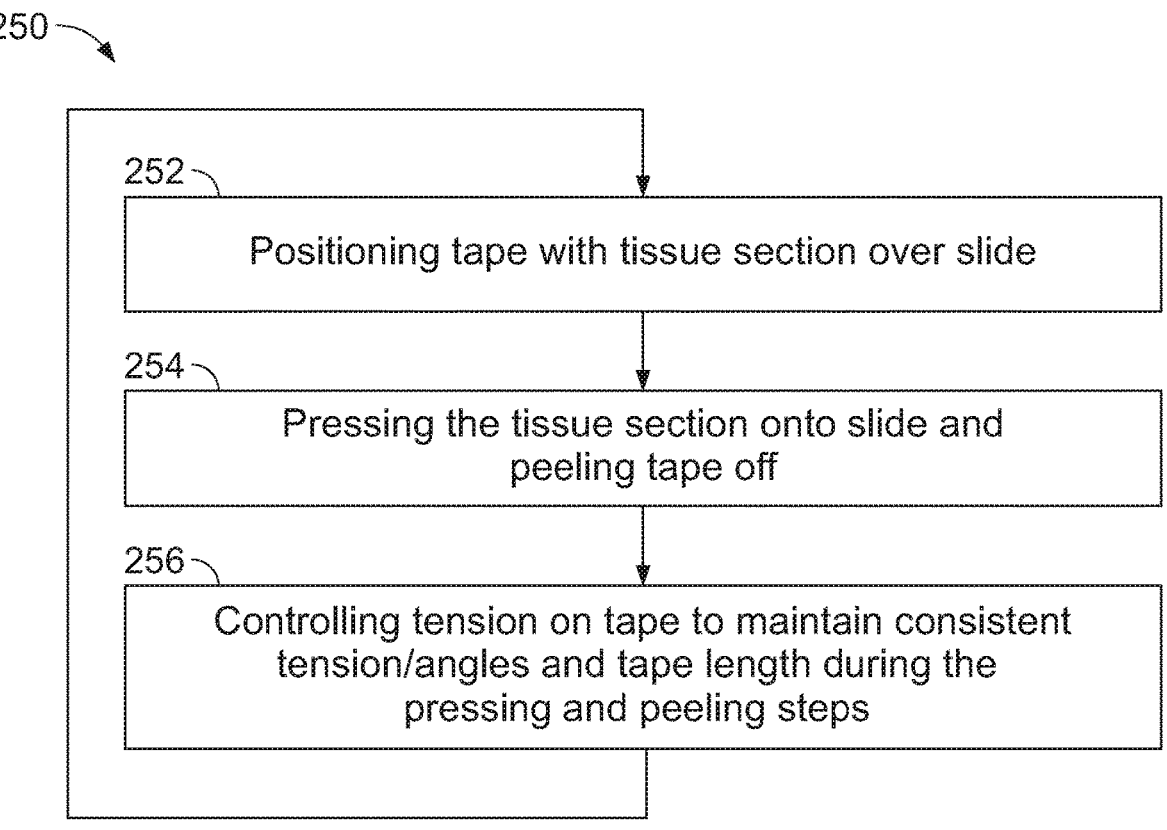

FIGS. 2A and 2B show example flow charts for implementing processes 200, 250 of controlling a level of tension over an adhesive transfer tape system 120, for example, using the system 150 in FIG. 1. FIG. 2A shows a process 200 for controlling a level of tension over the transfer tape 120 during microtome 164 sectioning of the tissue block 106 while FIG. 2B shows a process 250 for controlling a level of tension over the transfer tape 120 during transfer of tissue section 108 from the transfer tape 120 onto slides 110.

In reference to FIG. 1 and FIG. 2A, the sectioning process 200 in FIG. 2A can start with the step 202 of adhering the transfer tape 120 to the block face of the tissue block 106. For example, a roller member on the tape applicator 114 can press an adhesive side of the transfer tape 120 onto the block face. Movement by a roller, of the tape applicator 114, against and across the block face of the tissue block 106 can cause the transfer tape 120 to adhere to the block face of the tissue block 106. Once the transfer tape 120 is adhered to the block face, a tissue section 108 can be sectioned off the tissue block to be transferred to the slide station 116 by the transfer tape 120.

To that end, at step 204, the tissue block holder 105 is moved toward the microtome 164 to place the tissue block 106 in a desired position for sectioning. In some embodiments, the microtome 164 can include a linear encoder on the microtome x-axis (horizontal axis that adjusts the thickness of the section). The linear encoder can directly report how much the chuck for the microtome 164 (rigidly attached on the x-axis) moves to the controller. Since the linear encoder is very close to the tissue block 106, the controller can differentiate between motion due to disturbances (motion due to external forces) and commanded motion. The motion detection can be used to determine the position of the tissue block 106 relative to the microtome 164 to place the tissue block 106 in the desired position.

Once the tape is adhered to the tissue block 106, the block 106 and the tape must move together, in step 206, the tape can be adjusted to accommodate the movement of the tissue block 106. In some embodiments, the microtome module 164 can include a mechanism for moving the tissue block holder 105 toward the microtome blade 103, while the movement of the transfer tape 120 is controlled by the tape feed mechanism 112 and the take-up mechanism 118. A timing imprecision of these two independent motion control mechanisms results in either excess or insufficient tape tension during sectioning, e.g., slack, or else, the opposite effect of excess tape tension thereby results.

At step 208, the microtomy system 150 can modify forces being applied to the transfer tape 120 to maintain a desired level tension on transfer tape 120 during the movement of the tissue block 106 and sectioning cut. For example, the tension control devices 122, 124 positioned upstream and/or downstream from the microtome 164 can work in combination or independently to modify a level of tension of across the transfer tape 120. In some embodiments, the tension control devices 122, 124, 126 can includes at least one actuator and at least one sensor. In some embodiments, the at least one sensor can determine the tension and/or relative angle of the transfer tape 120. In some embodiments, the at least one actuator can be configured to actively control the tension of the transfer tape 120. In some embodiments, the at least one actuator can be a passive actuator.

In some embodiments, the level of tension can be determined/managed during the sectioning process. One of the tension control devices 122, 124 can pull the transfer tape 120 on the downstream direction and establish tension there. The tension control devices 122, 124 can move in different directions provide different effects. For example, the tension control devices 122, 124 (for example dancer 158, or swing arm) can move in the direction of motion (down), so when the microtome 164 moves down, the tension control devices 122, 124 can move with microtome 164 to keep the level of tension substantially constant. The tension control devices 122, 124 motion can be designed with limited movement/range such that, during sectioning, the tension control devices 122, 124 does not reach the end of its travel range. In some embodiments, on the upstream side, the tape can be pulled by the tape take-up reel 182 motor 180 while another dancer can keep the tension level controlled. In this manner, the transfer tape 120 is under tension control rather than under motion control, which is can be dictated by the microtome 164. Thus, the tension control devices 122, 124 adjust tension of the transfer tape 120 to accommodate the tissue block 106 motion, so that there is no need for joint coordination of two independent position control systems. Advantageously, this and other embodiments disclosed herein, provide for a system in which the transfer tape 120 can be maintained with non-uniform tension through the system. For example, there may be tension on the transfer tape 120 that is dictated by the tension control device 122, 124 when the transfer tape is not engaged with the tissue block 106. In some cases, there may be no tension when the transfer tape 120 is attached to the face of the tissue block 106, e.g., transfer tape 120 application to the face of the tissue block 106 prior to the cut on the microtome 103, during the vertical motion of the tissue block 106 for cutting while the transfer tape 120 is attached to the ACTIVE 64876541v1 tissue block 106 on the microtome 103, or when the tissue section 108 is removed from tape to the glass slide (tissue peel off) (on the glass slide 110).

The nature of the microtomy system 150 can vary, depending on the design. In some embodiments, the transfer tape 120 could be held stationary at both ends, for example, by the tape feed mechanism 112 and the take-up mechanism 118, while the tension control devices 122, 124 adjust the tension on the tape to accommodate the full motion of the tissue block 106. Alternatively, or additionally, the tape feed mechanism 112 and the take-up mechanism 118 can coordinate the tape movement with the tissue block 106 movement, while the tension control devices 122, 124 operate to accommodate the error in the movement of the tape relative to the movement of the tissue block.

In step 210, the microtome blade 103 can cut the tissue section 108 from the tissue block 106. After the cut, the transfer tape 120 can be pulled away from the tissue block 106 with the tissue section 108 which will be adhered to the transfer tape 120. The microtome 164 can then advance the tissue block 106 forward and this can define a new block face for sectioning. The process can then begin again for the next tissue section 108 sectioning. Thereafter, with tissue section 108 adhered to the transfer tape 120, the transfer tape 120 can advance (e.g., via feed mechanism 112) away from the microtome 164 toward the slide station 116.

In reference to FIG. 1 and FIG. 2B, the transfer tape 120 with the tissue sections 108 thereon can be moved by the motorized reels (tape feed mechanism 112 and take-up mechanism 118) towards the slide station 116, where the tissue section 108 that is adhered to the transfer tape 120 is transferred to a slide 110. The process 200 in FIG. 2B can start with the step 252 of positioning the transfer tape 120, with the tissue section 108 adhered thereto, proximate to a slide 110. In some embodiments, the transfer tape 120 including the tissue sections 108 can be positioned over a slide 110 that is coated with an ultraviolet ("UV") curable adhesive. At step 254, the tissue section 108 can be pressed onto the slide 110 and the transfer tape 120 is peeled off of the slide 110, leaving the tissue section 108 on the slide 110. For example, a roller may press the tissue section 108 on the transfer tape 120 onto the slide 110. In some embodiments, a UV light source can activate the UV adhesive on the slide 110, thereby bonding the tissue section 108 to the slide 110. The transfer process may also include intermediate steps between transfer tape 120 application and peeling, such as curing adhesive on the slide 110 to retain the tissue sample portion of the tissue section 108.

The transfer of the tissue sections 108 from the transfer tape 120 to the slides 110 may require changes to the pathway of the transfer tape 120 relative to the slide 110. Accordingly, as with the motion of the block 106 during sectioning, the processes of applying and peeling the transfer tape 120 entails a risk of generating excessive or insufficient tension, or an improper relative angle. It is therefore desirable to maintain a controlled tension, or in some cases slack, in the transfer tape 120 during the slide application and peeling processes. To address this, at step 256, the microtomy system 150 can be configured to control forces applied to the transfer tape 120 at the slide station 116 to maintain a desired level tension on transfer tape 120 during transfer of the tissue section 108 from the transfer tape 120 to the slides 110. Alternatively, or additionally, at step 256, similar to step 208, the microtomy system 150 can be configured to control the relative angle of the transfer tape 120 at the slide station 116 to maintain a desired angle of approach of the transfer tape 120 during transfer of the tissue section 108 from the transfer tape 120 to the slides 110.

Once the tissue section 108 is on the slide 110, the transfer tape 120 can be transferred away from the slide station 116 and collected on the take up reel 118. This process 210 can then be repeated for the next tissue section 108 adhered to the next portion of die transfer tape 120.

Next, exemplary embodiments of the system configured to control tension at the microtome module and the slide station will be described.

Tension Control at Microtome Module

Figure 3A:
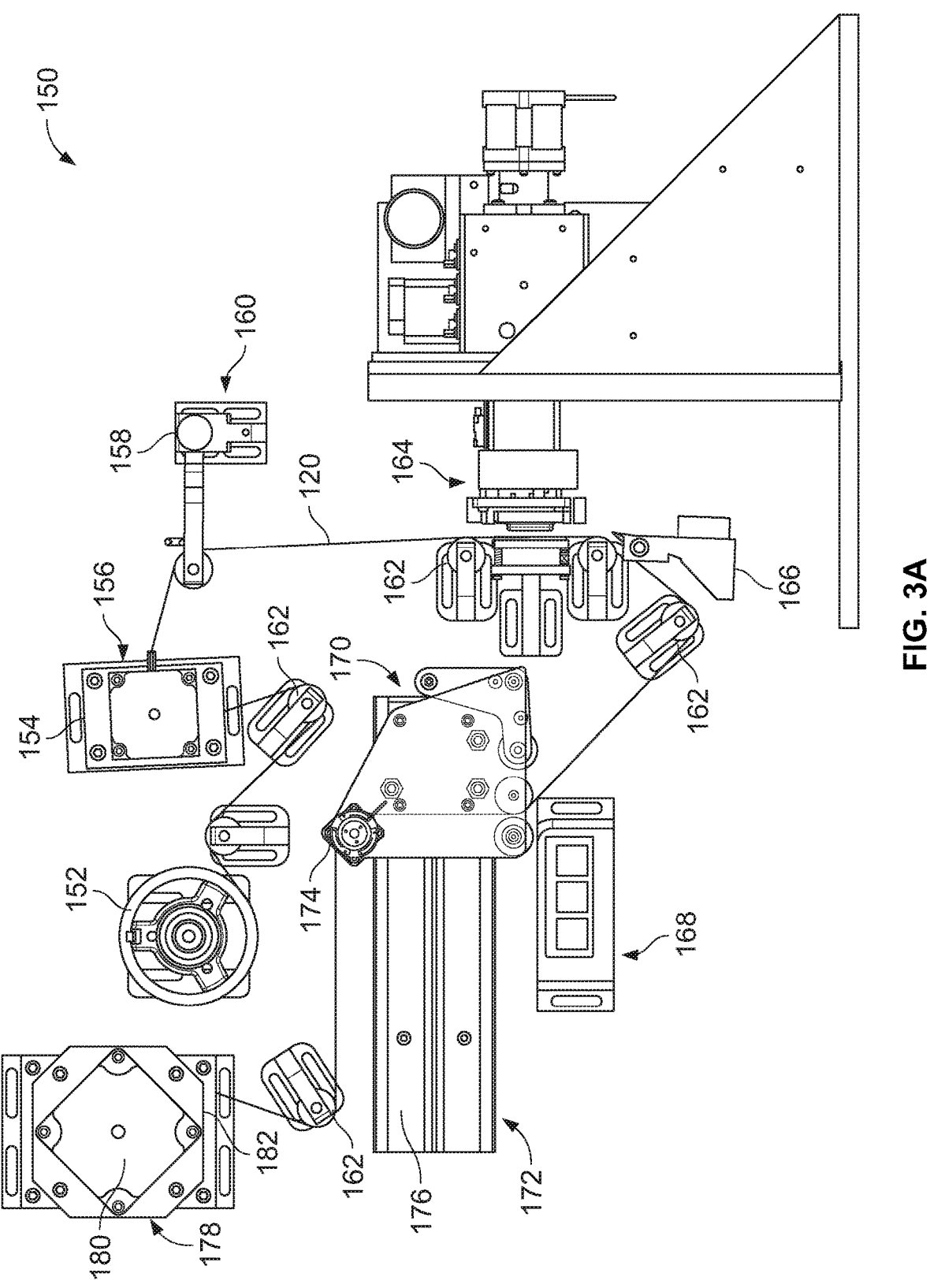
FIGS. 3A, 3B, and 3C, are illustrative view of transfer tape system in accordance with the present disclosure.
Figure 3B:
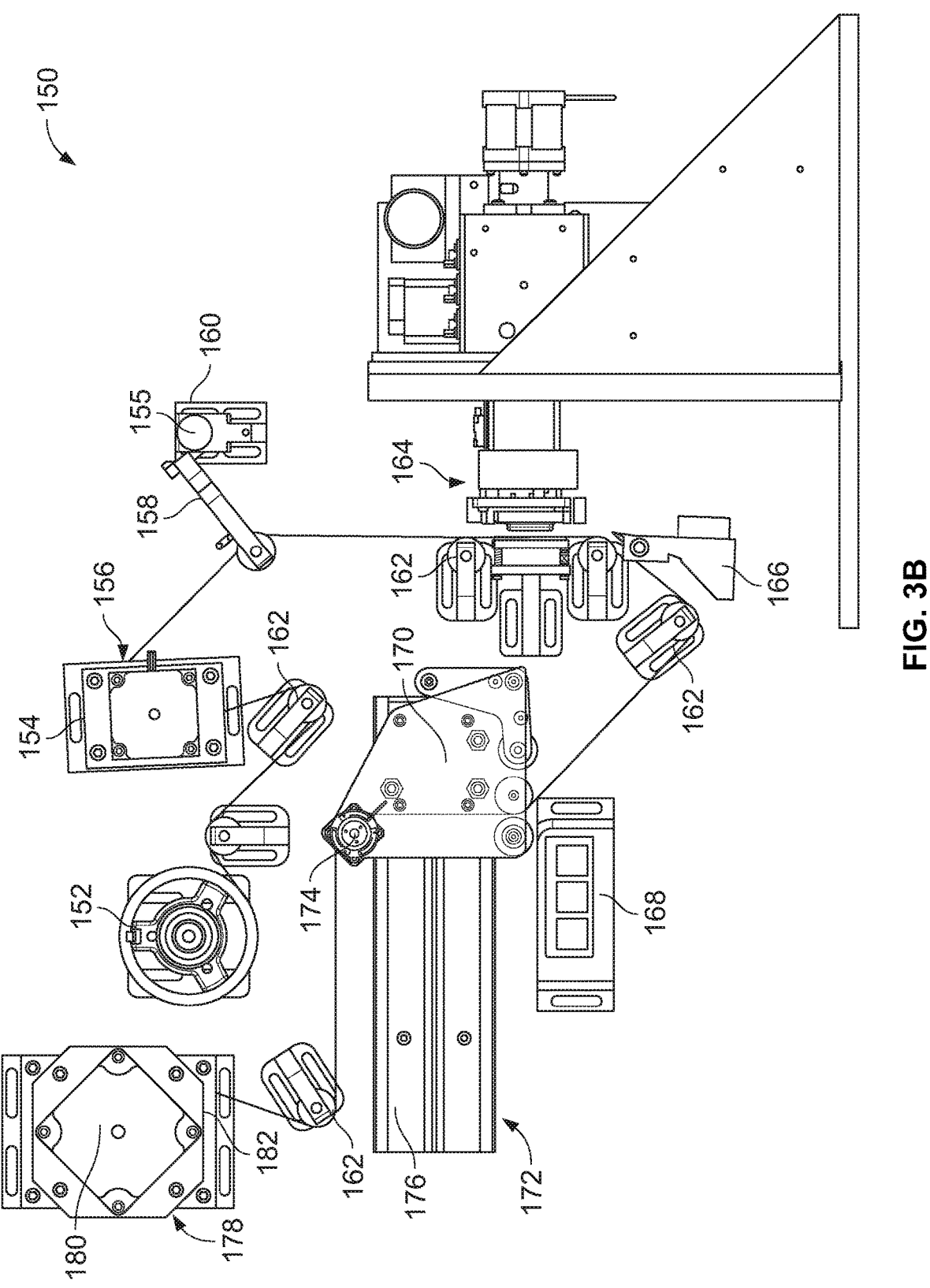
Figure 3C:
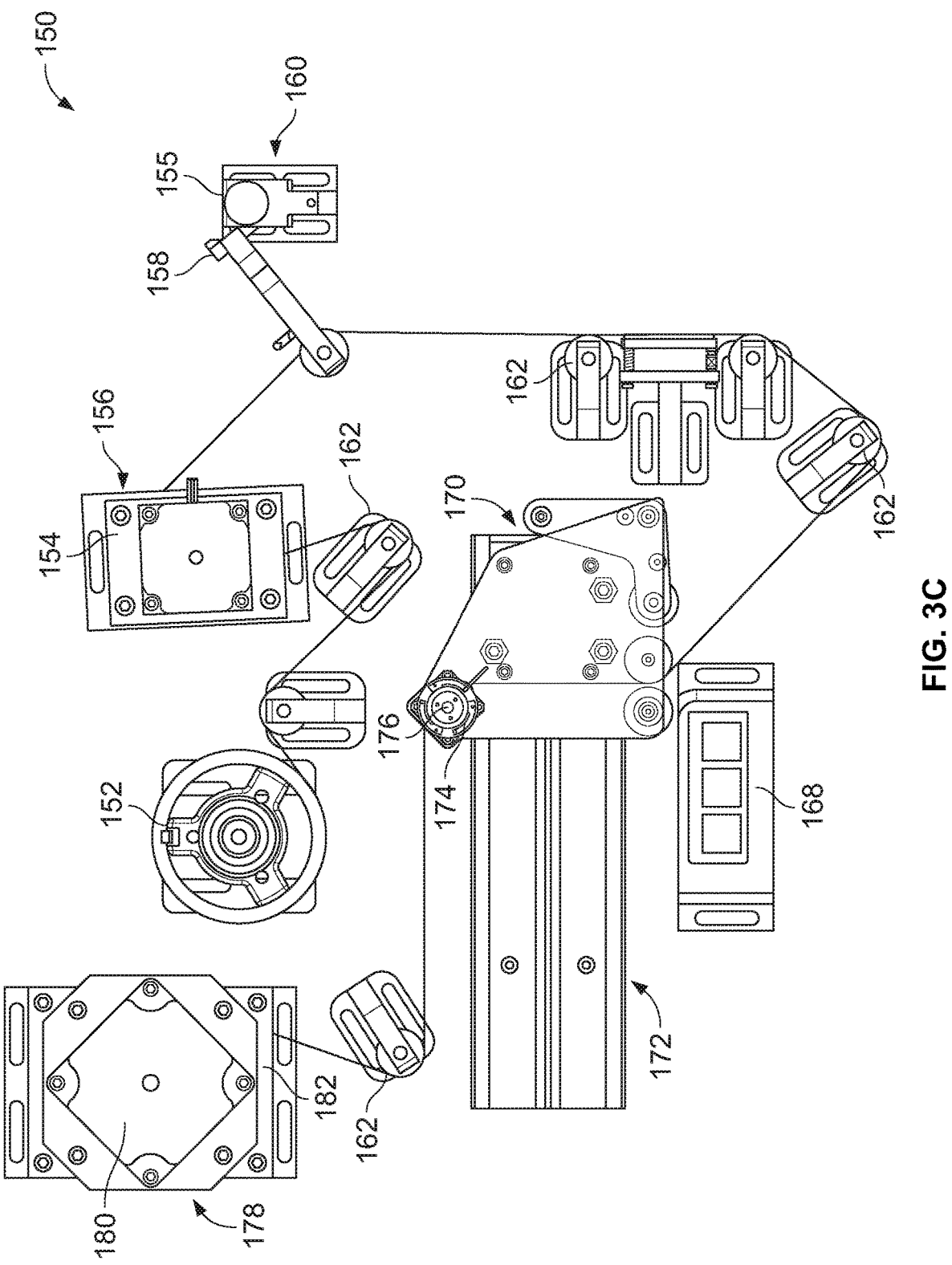

FIG. 3A-FIG. 3C present a schematic view of an exemplary microtomy system 150, for use within a microtomy system having a plurality of tension control devices. The microtomy system 150 can include any combination of tension control devices positioned at different points along a transfer tape 120 to control a level of tension along the transfer tape 120. The elements can be used independently or in combination with one another such that the microtomy system 150 can include just one of the tension control devices or any combination of the tension control devices. In some embodiments, the microtomy system 150 can include an input tape reel 152 and any combination of, a stepper motor 154, an encoder 156, a dancer 158, and absoluter encoder 160, an idler 162, the microtome 164, a blade holder 166, a slide table 168, a slide press sled 170, a linear actuator 172, a shaft brake 174, an encoder 176, an encoder 178, a motor 180, and a take-up reel 182. The tension in the transfer tape 120 may not necessarily uniform. For example, there can be one tension upstream from the tissue block 106, and one tension downstream of the tissue block 106. Because the transfer tape 120 sticks to the tissue block 106, these tensions will in general be different, and will be controlled within different ranges. The zero tension, or slack, case can apply to a portion of transfer tape 120 downstream of the tissue block 106, in the microtome 164. Similar considerations can apply to the slide 110 where the transfer tape 120 will adhere to the slide 110, creating upstream and downstream segments of the transfer tape 120 can, in general, have different tensions, controlled within different ranges.

In some embodiments, any combination of the encoders 156, 160, 176, 178 can be implemented at different locations to provide updates to the controller as to the motion of the transfer tape 120. Each of the encoders 156, 160, 176, 178 can be the same type of encoder or different types of encoders based on location/purpose. For example, encoder 156 can be an incremental encoder on an idler roller 162 to detect its rotation and the encoder 160 can be an absolute encoder to provide position of the dancer 158 arm. The difference between an incremental and absolute encoder is that incremental encoder sends pulses and counter counts them. Incremental encoders need to be homed to a known location after a power cycle while an absolute encoder sends signals that would tell the controller where it is as opposed to sending pulses to be counted. The microtomy system 150 can incorporate any combination of the encoders 156, 160, 176, 178 to obtain data about the position, travel speed, distance traveled, tension, etc. for the transfer tape 120.

In some embodiments, the microtomy system 150 can also include a plurality of idler rollers 162 positioned along a length of the transfer tape 120 feed such that the idler rollers 162 provide a structure to feed the transfer tape 120 through the various components of the microtomy system 150. In some embodiments, the idler rollers may be coated with anti-stick, non-stick, or reduced friction, materials to decrease friction between the transfer tape system and the idler rollers. One or more of the rollers used in the system may be driven by a motor and be connected to an encoder to track or regulate the progression of the transfer tape system through the system. In some embodiments, a brake may be also provided on actively driven motors. In some embodiments, such rollers may be uncoated to ensure traction between the transfer tape system and such rollers. Otherwise, the transfer tape system may slip (without turning the roller) so that the system may be unable to accurately track or regulate progression of the transfer tape system.

Continuing with FIG. 3A, in some embodiments, the path of the transfer tape 120 through the microtomy system 150 can start at the input tape reel 152 which can receive a supply of transfer tape 120. The motorized input tape reel 152 can be positioned such that it feeds the transfer tape 120 into a stepper motor 154 either directly or via a combination of idler rollers 162. In some embodiments, the stepper motor 154 can dictate a rate in which the transfer tape 120 is introduced and/or withdrawn from the microtomy system 150. For example, the controller can dictate the speed that the stepper motor 154 can operate at to maintain desired characteristics of the transfer tape 120 (e.g., a level of tension). The input tape reel 152 and the stepper motor 154 can include any combination of mechanisms for controlling advancement of the transfer tape 120. For example, the input tape reel 152 and the stepper motor 154 can be similar to the tape feed mechanism 112 discussed with respect to FIGS. 1-2B.

The controller can use information obtained from any combination of the input tape reel 152, stepper motor 154, and encoders 156, 160, 176, 178 to modify operation of the tape reel 152 and the stepper motor 154. In some embodiments, the stepper motor 154 can include or otherwise be connected to an encoder 156. For example, the stepper motor 154 can pull the transfer tape 120 off the input tape reel 152 and can include an encoder designed to verify how much the stepper motor 154 has turned. In some embodiments, it can be detected if the stepper motor 154 is missing steps, or not, by comparing the data from encoder 156. If the transfer tape 120 is under high tension and the motor 154 cannot pull the transfer tape 120 when commanded, the encoder may not record any change, but the controller can still send pulses motor to turn. The controller can detect this discrepancy and determine a slip of the transfer tape 120.

Referring to FIGS. 3A and 3B, in some embodiments, the one or more tension control devices may be implemented in a variety of ways, including the mechanical dancer 158, which moves to accommodate changes in the transfer tape 120 path or a roller. The dancer 158 can include a rotatable axis at one end of the arm and a roller to receive the transfer tape 120 at the other end and that pulls in or lets out the transfer tape 120. The dancer 158 arm can be free to rotate around the rotatable axis can actuate in response to a level of tension acting on the transfers medium 120 through its roller. The dancer 158, roller, or other mechanism can be actuated in a variety of ways, including a spring, a counterweight, an electromagnet, pneumatics, or with a series-elastic actuator. Even a sufficiently elastic tape medium 120 could be used as a tension control element, allowing the transfer tape 120 itself to maintain a desired range of tension, despite imperfect coordination of the transfer tape 120 and block motion (position) control systems. For example, when the tension on the transfer tape 120 increases, the arm of the dancer 158 can move closer to the microtome 164 (i.e., down) and the tension can be relieved. In some embodiments, the dancer 158 can include a spring for restoring the position of the dancer 158, for example, when tension is relieved, the spring can pull the dancer 158 arm up.

In some embodiments, instead of a structural spring element, a motor under torque control, such as the stepper motor 155 (e.g., DC current motor), can be provided to rotate the dancer 158 arm to assist in controlling tension to the transfer tape 120. For example, the motor 155 can be coupled to the dancer 158 arm such that it can act on the dancer 158 arm to actively rotate it about the rotatable axis. In this configuration, when the motor 155 moves in an arc, the dancer 158 arm can rotate with it. In some embodiments, the stepper motor 155 can receive a command (e.g., from the controller) to rotate a certain amount and does not have to check how much the motor rotated. The stepper motor 155 can also be a different type of motor, however, in the case of DC or Brushless DC motor, it may need an additional feedback loop (such as having an additional encoder) to tell how much the motor rotated.

In some embodiments, the encoder 160 can be an absolute encoder attached to the dancer 158 to determine the deflection of the transfer tape and/or the dancer 158. For example, the encoder 160 can read a position/rotation of the dancer 158 arm. Based on information from the encoder 160, the motor 154 can apply torque as a function of the rotation of the dancer 158 arm. This can create a dynamic spring with a closed loop system, i.e., the spring constant may be adjusted by changing the closed loop control system parameters. For example, using a closed loop control with a proportional-integral-derivative (PID) control law with a spring like behavior can be created and the PID control constants can be adjusted to change the effective spring stiffness.

In some embodiments, the transfer tape 120 can be directed from the mechanical dancer 158 toward the microtome 164 for processing (e.g., sectioning). The transfer tape 120 can be directed, for example, via a combination of idler rollers 162, substantially adjacent to the microtome 164 and blade holder 166 such that the transfer tape 120 can receive sectioned samples cut by the microtome 164 on its surface, as discussed in greater detail herein.

Referring to FIG. 3C, in some embodiments the microtomy system 150 can be designed to be removeable from a larger system, like a drawer, for ease of maintenance and tape components exchange. Such a system can have additional components allowing for the retention of tension of the transfer tape 120 during exchange between and old and new transfer tape reels, upon transfer tape 120 replacement. A tape handler drawer can facilitate maintenance operations including exchanging consumables, cleaning, and repairing an automated device, etc. In some embodiments, each of the components provided in FIG. 3C can be part of the removeable drawer.

In some embodiments, between the time when the transfer tape 120 can be applied to the block face of the tissue block 106 and the end of the sectioning cut, the transfer tape 120 can be sustained in a controlled state of sufficiently low tension. The timing can be controlled by the controller by adjusting motor speeds for the microtome 164. In some embodiments, the tape driver motors 154, 180 can stop moving the transfer tape 120 and the transfer tape 120 can be attached to the block face of the block 106 by pushing the block face against the transfer tape 120. For example, a tape applicator can push an adhesive side of the transfer tape 120 onto the face of the block 106. Thereafter, the transfer tape 120 and microtome 164 motion are coupled, such that, as the microtome 164 moves down, the transfer tape 120 follows the microtome 164 while the dancer 158 moves to allow the transfer tape 120 to do go down. The force being applied by the dancer 158 can vary depending on the type of transfer tape 120 and geometry changes to the components of the system. For example, the dancer 158 of the upstream of the block sectioning microtome 164 area can provide around 0.6 N to 2 N of tension. The sectioning processes can be forgiving to tension changes. In some examples, it can be advantageous to maintain control of the tension in the transfer tape 120 such that it is maintained within a pre-defined range, e.g., not zero (slack).

In some embodiments, on the downstream side, the transfer tape 120 can be pulled by the take-up reel 182 motor 180 to reduce, or prevent, slack created downstream. The take-up reel 182 and the motor 180 can include any combination of mechanisms for controlling advancement of the transfer tape 120. For example, the take-up reel 182 and the motor 180 can be similar to the take-tip mechanism 118 discussed with respect to FIGS. 1-2B. Once the sectioning of the tissue section 108 from the block 106 is complete, the dancer 158 can pull the transfer tape 120 up (passively or actively) to balance the tension between the downstream and upstream positions of the transfer tape 120. In some embodiments, an additional, or alternative, passive dancer can be disposed between the roller 162 and the slide table 168.

In some embodiments, during the actual sectioning cut, the absolute position of the transfer tape 120, physically attached to the block face, can be controlled by the uniaxial cutting motion of the sectioning microtome 164. Tension control devices integrated along the overall microtomy system 150 may then maintain precise, implicit control of the transfer tape 120 tension, while still accommodating the motion of the microtome 164. Once the microtome 164 completes the cut, the tissue section 108 that has been cut from the tissue block 106 remains adhered to the transfer tape 120. Therefore, the coordinated movement of the tissue block 106, microtome 164 and transfer tape 120 creates a force-mediated control of web tension during sectioning, such that, the risks of excessive transfer tape 120 tension are mitigated while controlling any slack in the transfer tape 120.

In some embodiments, the microtomy system 150 can include a dancer 158 providing for controlled tension while sectioning a tissue block 106 with the microtome 164 cutting assembly, removing, therefore, the requirement of having to coordinate any correlated movement between the sectioning microtome 164 and the input tape reel 152. The dancer 158 can accommodate slack of the transfer tape 120 within the rotational, vertical, and/or lateral motion range of the dancer 158. For example, when the tension on the transfer tape 120 increases, the dancer 158 arm can move down to lower the tension on the transfer tape 120 and when the transfer tape 120 tension decreases, the dancer 158 can move up to increase the tension on the transfer tape 120. In this configuration, the dancer 158 can act as a passive control element relying a spring force to move up or down. In some embodiments, the tension along the transfer tape 120 may be controlled in a closed loop system, using structural springs having different spring constants.

In some embodiments, active motion control of the dancer 158 can be controlled by the closed loop system (i.e., the controller) and may optionally depend upon variable spring stiffness, in which the dancer 158 applies tension on the transfer tape 120, such that the transfer tape 120 does not get inadvertently cut while a tissue section 108 is taken from the tissue block 106. In some embodiments, the dancer 158 may also utilize a structural spring element that provides the capability of applying tension to the transfer tape 120.

In some embodiments, slack along the transfer tape 120 can be controlled by the use of motorized control of the dancer 158 within the closed loop system that enables controlled stiffness or variable spring stiffness. In some embodiments, one or more sensors may be attached to the dancer 158 to determine its position, and/or the tension it experiences to maintain a closed loop control. For example, the controller in a closed loop control system can calculate the error between a desired state and its actual value and apply a mathematical function of this error to apply a control signal, in order to control the motion of the dancer 158 and regulate tension on the transfer tape system.

In some embodiments, slack in the transfer tape 120 can be controlled though the use of the input tape reel 152 in the input feed and another motor 180 in the take-up section 182 of the transfer tape 120 path capable of controlling torque instead of or in addition to positions along the transfer tape 120. For example, the input tape reel 152 and/or take-up reel 182 can control the slack by releasing/wrapping the transfer tape 120 at either or both ends at different rates and the dancer 158 can convert the different pull amounts to control tension.

In some embodiments, slack in the transfer tape 120 can be controlled through the implementation of one or more sensors during sectioning of the tissue block 106, as discussed above. The one or more sensors can be situated along the transfer tape 120 to control the location of the transfer tape 120 and other elements in the microtomy system 150, for example, determine the position of the tissue block 106 to prevent cutting of the transfer tape 120. The one or more sensors can intrinsically measure or reveal any slack in the transfer tape 120.

In some embodiments, slack in the transfer tape 120 can be controlled through the use of a tape guide at the interface between the blade holder 166 and the transfer tape 120. For example, the tape guide can provide a tight channel through which the transfer tape 120 travels, preventing any transverse displacement of the transfer tape 120 that would otherwise constitute any unwanted deviation from the normal to a flat plane, e.g., a two-dimensional description of the tape channel geometry.

In some embodiments, reducing, or precluding, transfer tape 120 slack during sectioning may rely on measuring the transfer tape 120 tension both upstream and downstream of the tissue block 106 and/or block/blade interface of the microtome 164. For example, the dancer 158 can provide tension control upstream while the motor 180 can control the tension downstream. In some embodiments the microtomy system 150 can include be an additional dancer (not depicted) downstream of the blade holder 166.

In some embodiments, the microtomy system 150 can also provide one or more sensors, for example, tension sensors collocated with one of the rollers or encoders, for measuring the tension of the transfer tape 120 both upstream and downstream. The measured tension levels allows the microtomy system 150 to control operation of the stepper motor 154 in conjunction with the motor 180 to dictate the amount of slack in the transfer tape 120. For example, slack in the transfer tape 120 can mean that the tension decreases, e.g., goes to zero, and therefore, the closed loop control between the motors 154, 180 and the tension sensors can act in coordination to restore the desired tension on the transfer tape 120. The desired tension can be restored using a combination of mechanisms discussed herein. For example, when a tension sensor measures low tension, the controller can command the motor 180 to pull more transfer tape 120 around the take-up reel 182 (e.g., via motor controller) in until the desired tension level is restored.

In some embodiments, measuring the position of the transfer tape 120 at a single location or at multiple locations can be used to adjust slack or excess tension. For example, the encoders 156, 160, 176, 178 can be used to track identifying marks on the transfer tape 120 and determine locations of different parts of the transfer tape 120 at any point in time. The transfer tape 120 dynamics are well established, and one can determine the tension of the transfer tape 120 simply based on its length. Multiple position measurements can be used to calculate the length of the transfer tape 120 and in tune the tension on it based on material properties Assuming there is no tape slip on the rollers, and a tight tape initial condition, it can be determined whether there is excess transfer tape 120 between the rollers or not. Thereafter, the transfer tape 120 length can be adjusted to adjust tension. For example, longer transfer tape 120 length than the initial length of the transfer tape 120 can trigger actions to increase tension.

In some embodiments, with one or more dancers 158 to control tension during a microtome cut, the movement of the dancers 158 can be minimized by coordinating the motion of the tape driving 152 components with the motion of the microtome 164 while the transfer tape 120 is attached to the paraffin block. For example, since the dancer 158 is spring loaded, with the transfer tape 120 being attached to the block face being pulled through the roller on the end of the dancer 158, when the block 106 moves down and pulls the dancer 158 down. Relying on spring forces, in this coordination, is of passive nature. This coordination also reduces any unwanted motion of the transfer tape 120 at the end of the sectioning by the microtome 164, also acting to minimize the variation in tension during the sectioning. The coordination may further can minimize the size and cost of the dancers 158 due to reduced stroke. In control systems terms, this strategy is to feedforward the microtome 164 motion to the input tape reel 152 to limit the scope of correction from the dancers 158 to unexpected disturbances, rather than treating the entire microtome 164 motion as a disturbance to be accommodated by the dancer(s).

Tension Control at Slide Station

Figures 3D, 3E:
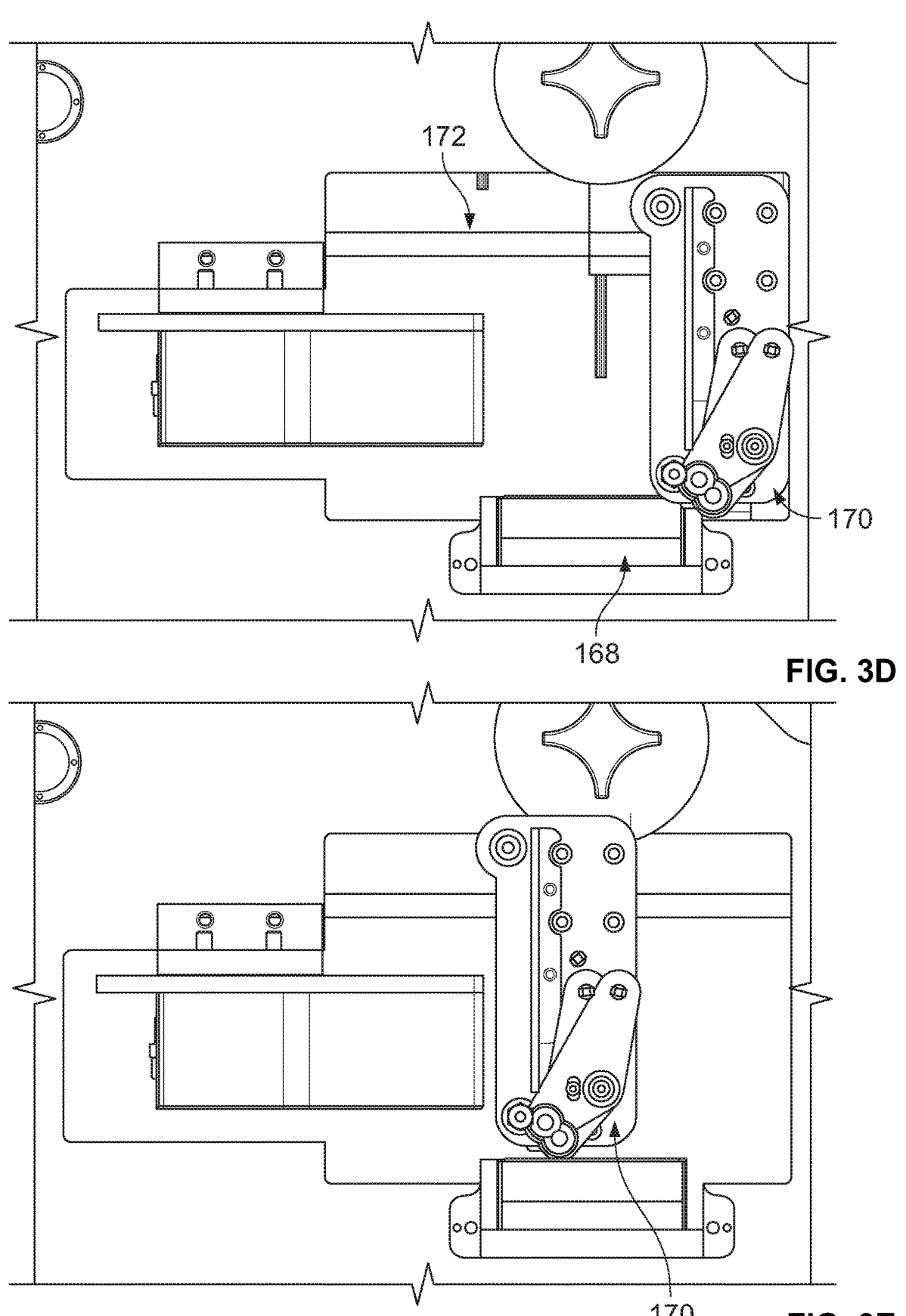
FIGS. 3D and 3E show exemplary embodiments of a slide transfer station in accordance with the present disclosure.
Figure 4:
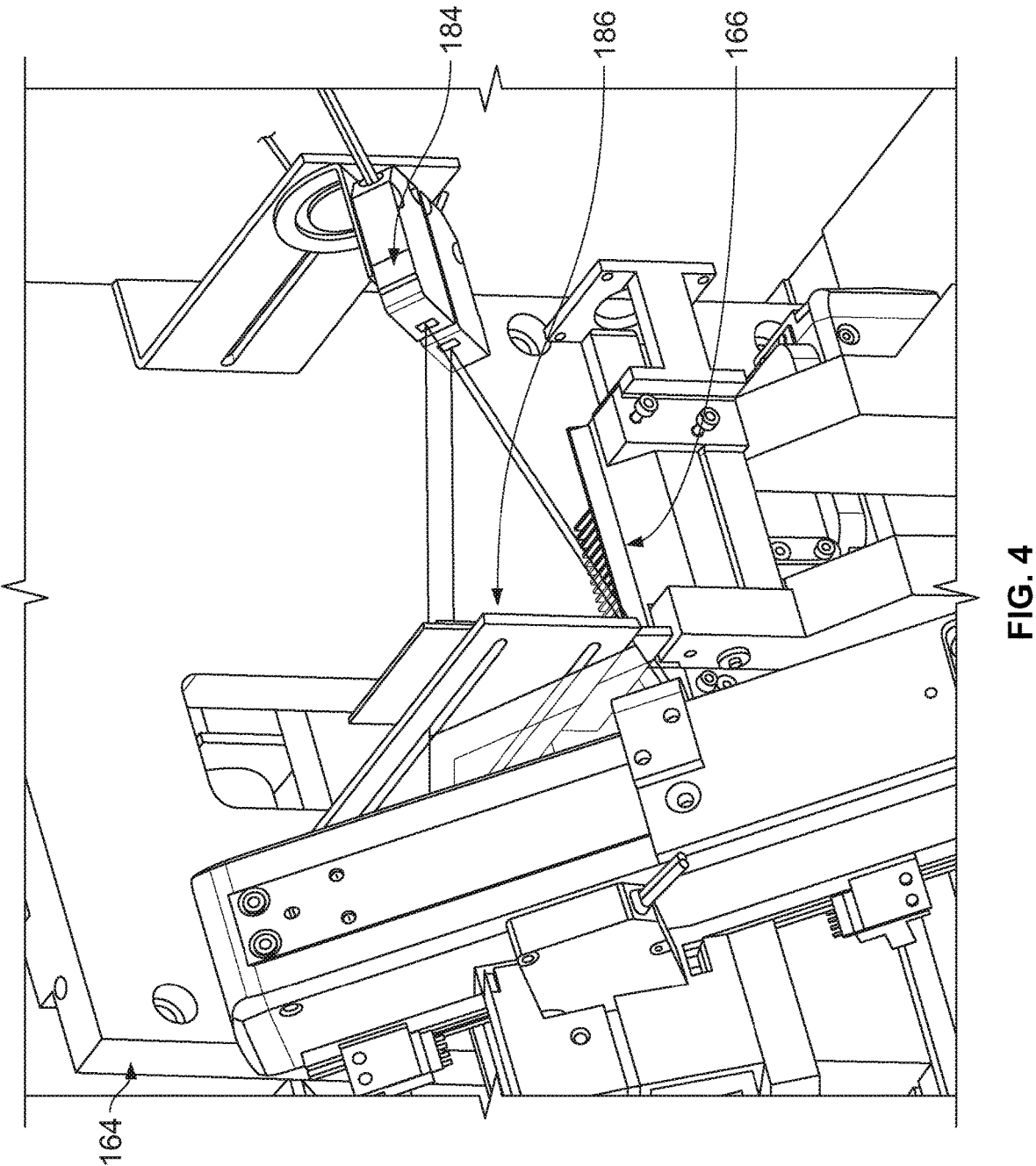
FIG. 4 is an illustrative view of microtome in accordance with the present disclosure.

FIG. 3D and FIG. 3E illustrate exemplary embodiments of the slide transfer system of the present disclosure. As noted above, the instant systems and methods can be used to control the tension and/or relative angle of the transfer tape 120 as various locations throughout the microtomy system 150. The tension and angle of the transfer tape 120 can vary as the transfer tape 120 travels through the system due to transmission forces of applying the tissue section 108 to the transfer tape 120 or from the transfer tape 120 to the slide 110. The tension and angle can vary upstream and downstream of those various locations. The slide transfer system of the present invention provides for controls and actuators (e.g., passive, or active) to maintain the required tension and angle of the transfer tape 120. The tension in the transfer tape 120 may not necessarily uniform. For example, there can be one tension upstream from the tissue block 106, and one tension downstream of the tissue block 106. Because the transfer tape 120 sticks to the tissue block 106, these tensions will in general be different, and will be controlled within different ranges. The zero tension, or slack, case can apply to a portion of transfer tape 120 downstream of the tissue block 106, in the microtome 164. Similar considerations can apply to the slide 110 where the transfer tape 120 will adhere to the slide 110, creating upstream and downstream segments of the transfer tape 120 can, in general, have different tensions, controlled within different ranges.

In some embodiments, the microtomy system 150 can be configured to retain tension of the transfer tape 120 during transfer of the cut tissue section 108 to the glass slide 110 from the transfer tape 120. The slide press sub-assembly can include a combination of rollers, a linear motion axis actuator 172, a slide table 168, and the structural components that hold all these together. In some embodiments, the microtomy system 150 can be used to retain tension of the transfer tape 120 using the slide table 168 or slide press sub-assembly. Decoupling the transfer of tissue sections 108 from the transfer tape 120 to the glass slide 110 can be derived from an independent subassembly that allows for retention of tension of the transfer tape 120 within the subassembly while preventing any loss of tension within the other portions of the microtomy system 150.

In some embodiments, the transfer tape 120 application and peeling processes can both be accomplished by a reciprocating sled-like mechanism that positions the transfer tape 120 above the glass slide 110 and presses it on as the sled 170 moves in one direction, and then peels the transfer tape 120 off as the slide press sled 170 moves in the other direction. Rollers on the slide press sled 170 can be arranged such that the fixed geometric length of the path of the transfer tape 120 is unchanged by the reciprocating motion of the slide press sled 170 as it executes these application and peeling processes. In some embodiments, a double roller can be in the slide press sled 170 to allows for a range of peel angles to be incorporated within the transfer tape 120 path as the sled 170 reciprocates during the transfer of the cut tissue section 108 to the glass slide 110 (positioned on slide table 168).

In some embodiments, the transfer tape 120 can be directed away from the microtome module 164 and toward the slide station 168 and slide press 170. In some embodiments, the slide press 170 can be part of an ultraviolet station designed to transfer tissue sections attached to the transfer tape 120 to microscope slides 110 that are pre-coated with UV-curable adhesive. The slide press 170 traverses the slide 110, rolling the transfer tape 120 down onto the slide 110, where the UV cured adhesive can enable adhesion of the cut tissue section 108 onto the glass microscope slide 110. Thereafter, the slide press 170 can reverse its motion, peeling the adhesive tape away from the cut tissue section 108, thereby completing the transfer of the tissue specimen onto the glass slide 110.

In some embodiments, the shaft brake 174 can be used to hold on to the transfer tape system when the slide transfer system 170 is backing up for a short period of time. In this manner, a small slack is provided to help peel the tape from the slide after curing. In some embodiments, the motion of the slide press 170 can be reversed to peel the tape off. In some embodiments, encoder 176 can be configured to measure the amount of tape being rolled on the roller.

In some embodiments, the path of the transfer tape 120 can be routed through the slide transfer system 170, such that the length of the path of the transfer tape 120 is unaltered by the reciprocal rolling motion of the slide press sled 170. Therefore, the transfer tape 120 positioning mechanisms external to the internal geometry of the pathway of the transfer tape 120 within the actual slide press sled 170 apparatus do not need to move in coordination with the slide press sled 170 itself during these processes to maintain controlled tension within the overall microtomy system 150. The slack of the transfer tape 120 when using the slide press sled 170 may be intrinsically modulated, such that any motors incorporated within the transfer tape 120 path are not required to move in unison with the slide press sled 170. The motors 154 and 180 can be stopped and the slide transfer system can 170 can move sideways, which motion is provided by the linear actuator 172. The motors 154 and 180 do not have to be in unison with the slide press sled 170 because the sled is a trolley-like device that reciprocates during the transfer of the cut tissue section 108 to the glass slide 110.
Control of Tissue Block Movement Referring to FIG. 4, in some embodiments, the microtomy system 150 can be used to monitor the approach of the tissue block 106 to the microtome 164 blade. Typically, the approach of the tissue block 106 to the microtome 164 blade needs to be both fast and precise. The precision can relate to one or both of the tension and angle of approach of the transfer tape 120. There are methods of performing this operation rather slowly but then the throughput of the whole device is significantly reduced. Moreover, the tissue block 106 could crash into the blade, if the motion is imprecisely controlled, thus rendering the blade useless for tissue sectioning, thereby increasing operational cost. Therefore, accurately positioning the block 106 with respect to the blade of the microtome 164 increases the throughput of the overall system, without damaging the microtome 164 blade.

In some embodiments, the microtomy system 150 may employ one or more sensors 184 to enable accurate positioning of the block 106 as it approaches the blade holder 166 to increase the speed and accuracy of the tissue block 106. The one or more sensors 184 can include an illumination source on one side of the tissue block 106 with a receiver on the opposing side. As the tissue block 106 approaches the cutting blade, the light intensity received by the receiver side sensor decreases. A calibrated sensor system would allow a time-dependent measurement of the position of the tissue block on the microtome chuck, as it approaches the blade (a few microns). In some embodiments, the one or more sensors 184 can be a transceiver for both sending and receiving a signal reflected back by a reflective surface 186. The one or more sensors 184 can include a touch sensor on the blade or block side to detect applied forces. In some embodiments, the one or more sensors 184 could measure the location of the block 106 surface with respect to some specified location referenced to the blade. Using one or more sensors 184, a plane defining the location where the tissue transfer occurs may be referenced to the sectioning blade.

Figure 5:
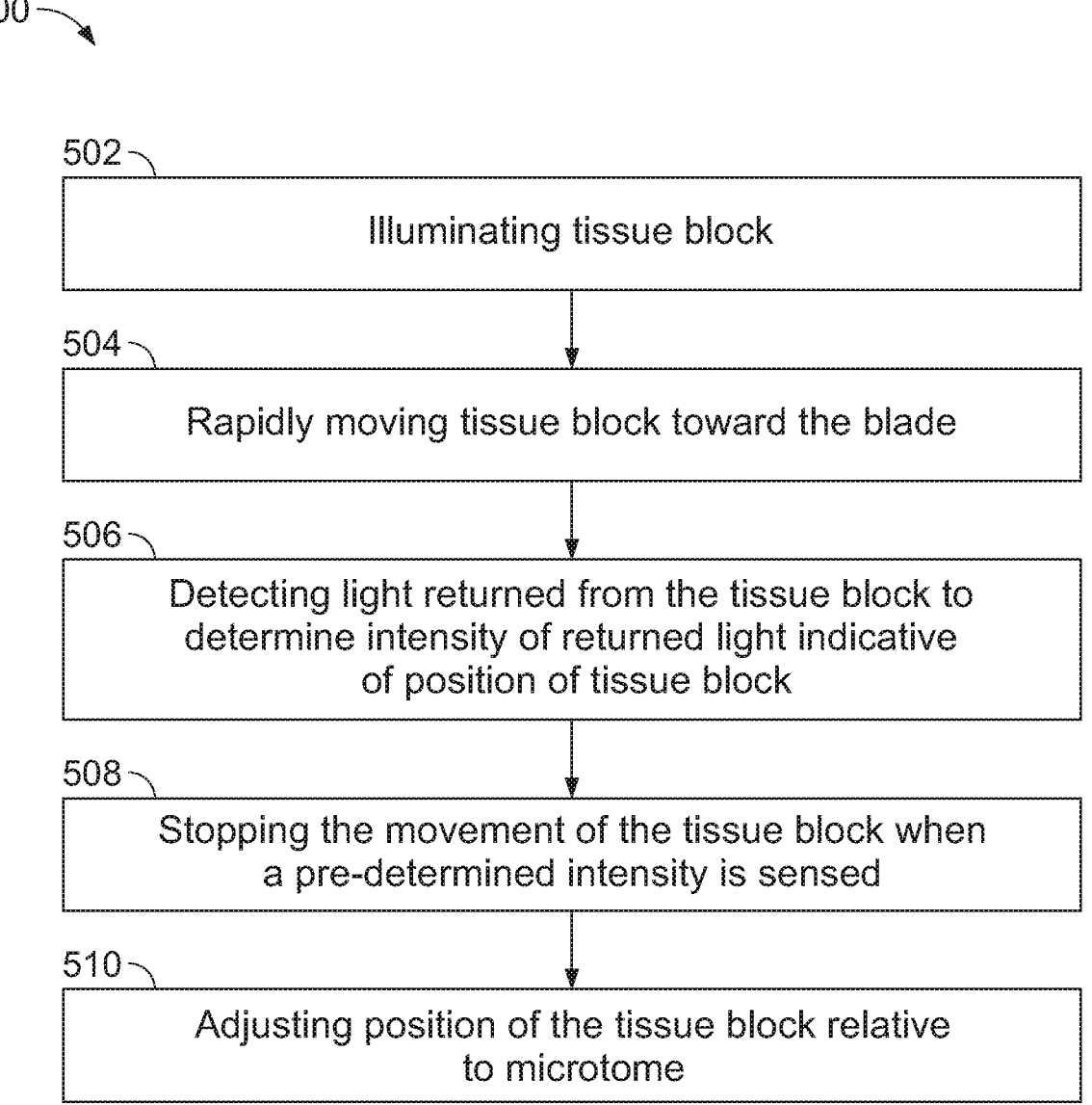
FIG. 5 is an example flow chart for operation of the transfer tape system in accordance with the present disclosure.

Referring to FIG. 5, an example flow charts for implementing process 500 for controlling sectioning by the microtome 164 is provided. At step 502 the sensor emitter 184 is used to illuminate the tissue block 106. At step 504, the microtome 164 rapidly moves the tissue block 106 toward the blade. At step 506, the sensor receiver 184 detects light returned from the tissue block 106 and determines an intensity of returned light indicative of position of tissue block 106. At step 508, the microtome 164 stops the movement of the tissue block 106 when a pre-determined intensity is sensed. At step 510, the microtome 164 adjusts position of the tissue block relative to microtome 164 blade.
Operation of the System In operation, the tension along the transfer tape system may be fully or partly measured and regulated by a control system.

Figure 7:
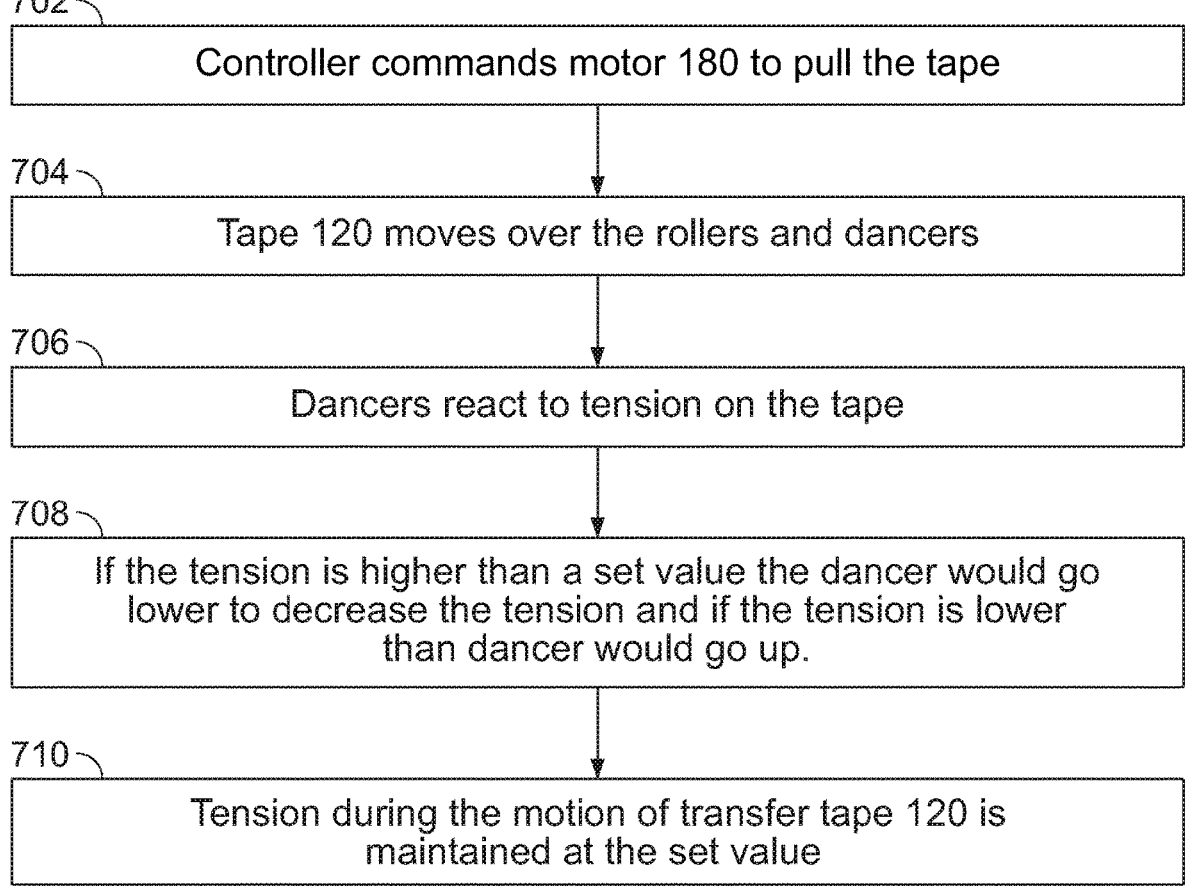

In some embodiments, as shown in FIGS. 6-8, the tension may be controlled by a controller configured to control the speed of the take-up reel 182 and/or of the input reel 152.

For example, as shown in FIG. 6, controller commands motor 180 to pull the tape (step 602), tape 120 moves the rollers (step 604) and tape tension sensors on the rollers detect the tension of the tape (step 606). The controller receives the tension value from the tension sensors, and if the tension is higher than a set value, the motor 180 is commanded to turn slower and if the tension is lower than a set value, motor 180 is commanded to turn faster (step 608). The system thus maintains a desired tension during the motion of transfer tape 120 (step 610).

In some embodiments, the tension may be controlled by using one or more tension control devices. For example, as shown in FIG. 7, controller can command motor 180 to pull the tape from the input tape reel (step 702). Tape 120 then moves over the rollers and dancers (step 704), which can react to the tension on the tape (step 706. If the tension is higher than a set value, the dancer would go lower to decrease the tension and if the tension is lower than the dancer, it would go up (step 708). The system thus maintains a desired tension during the motion of transfer tape 120 (step 710).

In some embodiments, the dancers may be fully controlled to fine tune the tension on the transfer tape system. For example, as shown in FIG. 8, controller commands motor 180 to pull the tape 120 (step 802), tape 120 moves over the rollers and one or more dancers (step 804), for example, dancer 158. The absolute encoder 160 can detect rotation of the dancer (step 806). The controller connected to the absolute encoder 160 and the motor 155 can then run an active control algorithm to minimize the rotational error on the dancer (increase or decrease tensions as necessary) (step 808). The corrective action acts like a dynamic spring to control the tension on tape 120 (step 810), thereby maintaining the desired tension on the transfer tape system.

In some embodiments, for example, as shown in FIG. 9, a controller commands motor 180 to pull the tape (step 902), tape 120 moves over the rollers (step 904) and tape angle sensors can detect the relative angle of the tape (step 906). The controller can receive the relative angle value from the sensors, and if the angle is larger than the set value the dancer 158 can be commanded to pivot in a first direction and if the angle is smaller than the set value dancer 158 can be commanded pivot in a second direction (step 908). The system can maintain the relative angle of the transfer tape 120 during the motion of transfer tape 120 (step 910).

Figure 10:
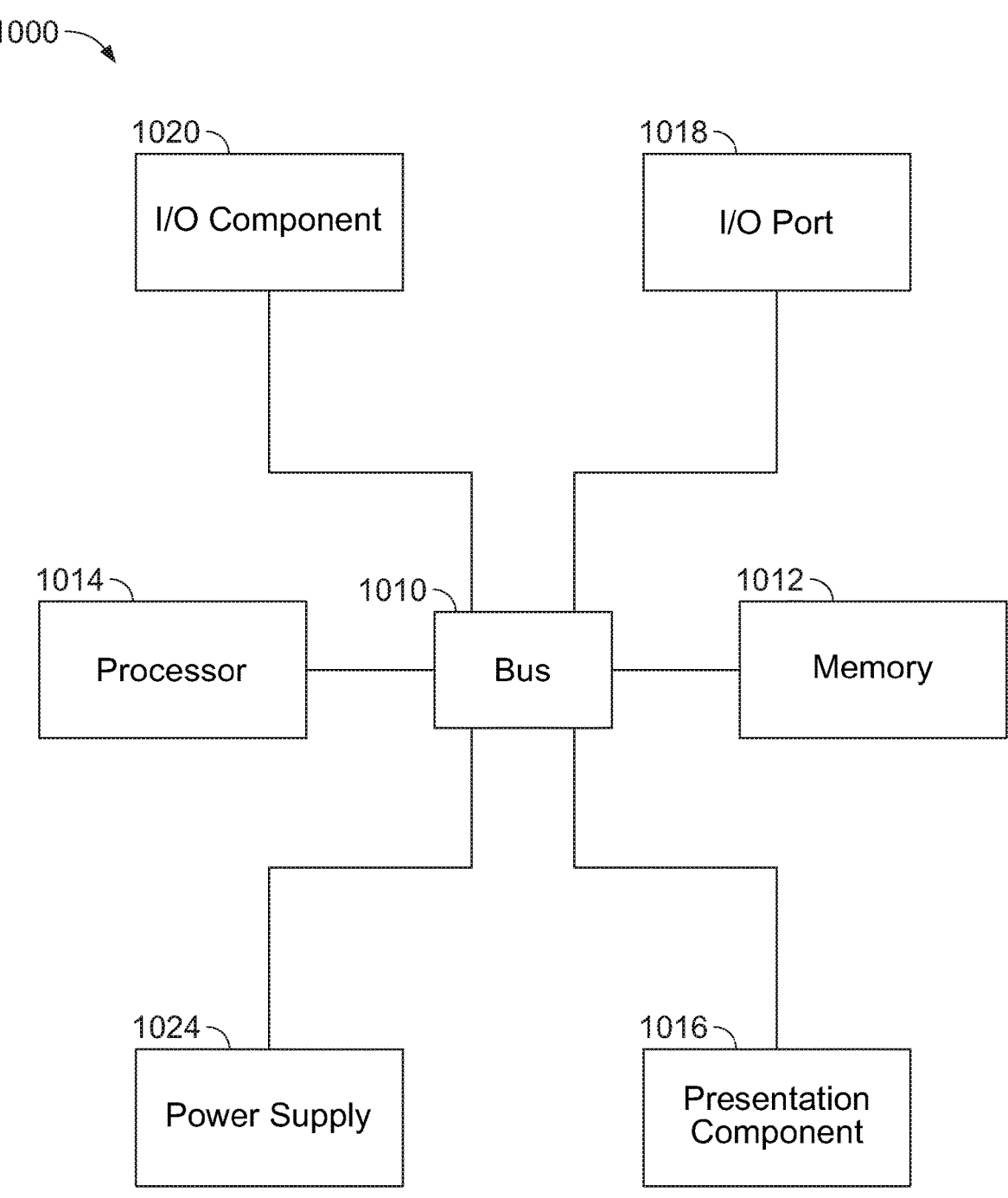
FIG. 10 is an exemplary high-level architecture for implementing processes in accordance with the present disclosure.

Any suitable computing device can be used to implement the control or computing devices and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1000 is depicted in FIG. 10. The computing device 1000 is merely an illustrative example of a suitable computing environment and in no way limits the scope of the present disclosure. A "computing device," as represented by FIG. 10, can include a "work-station," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present disclosure may utilize any number of computing devices 1000 in any number of different ways to implement a single embodiment of the present disclosure. Accordingly, embodiments of the present disclosure are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10 is merely illustrative of an exemplary computing device that can be used to implement one or more embodiments of the present disclosure, and in no way limits the disclosure.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations.

As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present disclosure be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A microtomy system comprising:
a microtome for sectioning a tissue section from a tissue block; and
a transfer tape system comprising:
a transfer tape configured to adhere to a front face of the tissue block and collect one or more tissue sections sectioned by the microtome and to transfer the one or more tissue sections to one or more slides; and
at least one tension device for controlling tension and an angle of the transfer tape relative the tissue block or the one or more slides, wherein:
the at least one tension device comprises:
a dancer, comprising a rotatable dancer arm;

at least one sensor attached to the dancer to determine at least one of a position of the dancer arm, a tension of the transfer tape, or a relative angle of the transfer tape; and at least one actuator configured to move the dancer arm;

the at least one actuator is configured to move the dancer arm to maintain the transfer tape at a predetermined tension or maintain the transfer tape at a predetermined angle relative to the tissue block or the one or more slides; and the microtomy system is configured to determine the tension of the transfer tape at a plurality of locations.

2. The microtomy system of claim 1, wherein the plurality of locations include at least two of a location upstream of the microtome, at the microtome, and downstream of the microtome.

3. The microtomy system of claim 1, further comprising, a block holder configured to hold and retain tissue block, wherein the block holder is movable relative to the microtome.

4. The microtomy system of claim 1, wherein the at least one actuator is configured to actively control the tension of the transfer tape.

5. The microtomy system of claim 1, wherein the at least one tension device is a passive tension device.

6. The microtomy system of claim 1, further comprising a slide station configured to receive the tissue section onto the one or more slides.

7. The microtomy system of claim 1, wherein the at least one sensor comprises an absolute encoder.

8. The microtomy system of claim 1, wherein the transfer tape system further comprises a stepper motor configured to dictate a rate at which the transfer tape is introduced or withdrawn from the microtomy system, wherein the rate is based on the position of the dancer arm determined by the at least one sensor.

9. A microtomy system comprising:

a microtome for sectioning a tissue section from a tissue block;

a transfer tape system comprising:

a transfer tape configured to adhere to a front face of the tissue block and collect one or more tissue sections sectioned by the microtome and to transfer the one or more tissue sections to one or more slides;

one or more rollers positioned along a length of the transfer tape; and a plurality of tension devices for controlling tension and an angle of the transfer tape relative the tissue block or the one or more slides, wherein each of the plurality of tension devices is configured to maintain the transfer tape at a predetermined tension or maintain the transfer tape at a predetermined angle relative to the tissue block or the one or more slides, wherein the plurality of tension devices comprises a first tension device positioned upstream of the microtome and a second tension device positioned downstream of the microtome; and a slide station configured to receive the tissue section onto the one or more slides.

10. The microtomy system of claim 9, wherein the tension of the transfer tape is maintained at different tensions at locations upstream and downstream of the slide station.

11. The microtomy system of claim 9, wherein an angle of the transfer tape relative to the slide station is maintained at locations upstream and downstream of the slide station.

12. The microtomy system of claim 9, wherein each of the plurality of tension devices includes at least one actuator and at least one sensor.

13. The microtomy system of claim 9, further comprising, a block holder configured to hold and retain tissue block, wherein the block holder is movable relative to the microtome.

14. The microtomy system of claim 9, wherein the plurality of tension devices comprises a third tension device positioned upstream of the slide station and a fourth tension device positioned downstream of the slide station.

* * * * *